United States Patent
Sasaki et al.

(10) Patent No.: US 10,170,767 B2
(45) Date of Patent: Jan. 1, 2019

(54) ENERGY STORAGE DEVICE

(71) Applicant: GS Yuasa International Ltd., Kyoto-shi (JP)

(72) Inventors: Takeshi Sasaki, Kyoto (JP); Hirokazu Kambayashi, Kyoto (JP); Kazuto Maeda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 276 days.

(21) Appl. No.: 15/078,961

(22) Filed: Mar. 23, 2016

(65) Prior Publication Data

US 2016/0285134 A1 Sep. 29, 2016

(30) Foreign Application Priority Data

Mar. 27, 2015 (JP) .................................. 2015-066953
Feb. 5, 2016 (JP) .................................. 2016-020707

(51) Int. Cl.
*H01M 10/0587* (2010.01)
*H01M 4/66* (2006.01)
(Continued)

(52) U.S. Cl.
CPC ............. *H01M 4/661* (2013.01); *H01M 2/26* (2013.01); *H01M 4/66* (2013.01);
(Continued)

(58) Field of Classification Search
CPC ...... H01M 10/0587; H01M 4/66; H01M 4/70; H01M 4/661; H01M 2/26; H01M 10/0431
See application file for complete search history.

(56) References Cited

U.S. PATENT DOCUMENTS 5,478,676 A * 12/1995 Turi .................. H01M 4/66
                                                  204/279
6,447,950 B1 * 9/2002 Iijima .................... H01M 2/26
                                                  429/209
(Continued)

FOREIGN PATENT DOCUMENTS

JP   H 11-283608 A   10/1999
JP   2000-173578 A   6/2000
(Continued)

OTHER PUBLICATIONS

JP2013168238 MT.*

*Primary Examiner* — Alexander Usyatinsky
(74) *Attorney, Agent, or Firm* — McGinn I.P. Law Group, PLLC.

(57) ABSTRACT

Provided is an energy storage device which includes: an electrode assembly including a positive electrode and a negative electrode respectively including a non-coated region having a metal foil; current collectors each having a support portion which is made to overlap with the non-coated region; and opposedly facing supports each configured to clamp the non-coated region cooperatively with the support portion, wherein at least one of the non-coated region, the support portion and the opposedly facing support includes a conductive layer having non-oxidizing property or hardly-oxidizable property, the conductive layer covering at least one surface out of a surface of the non-coated region facing the support portion, a surface of the non-coated region facing the opposedly facing support, a surface of the support portion facing the non-coated region, and a surface of the opposedly facing support facing the non-coated region.

11 Claims, 20 Drawing Sheets

(51) Int. Cl.
*H01M 10/0567* (2010.01)
*H01M 2/26* (2006.01)
*H01M 10/04* (2006.01)
*H01M 4/70* (2006.01)

(52) U.S. Cl.
CPC ... *H01M 10/0431* (2013.01); *H01M 10/0567* (2013.01); *H01M 4/70* (2013.01)

(56) References Cited

U.S. PATENT DOCUMENTS

| | | | |
|---|---|---|---|
| 7,486,497 B2* | 2/2009 | Kobayashi | H01G 11/38 29/25.03 |
| 7,846,497 B2* | 12/2010 | Gold | C23C 16/4412 137/1 |
| 2005/0048367 A1* | 3/2005 | Igaki | H01M 4/0404 429/212 |
| 2012/0237810 A1* | 9/2012 | Sasaki | H01M 10/0431 429/94 |
| 2014/0127571 A1* | 5/2014 | Moroishi | H01M 4/13 429/211 |
| 2014/0170452 A1* | 6/2014 | Abe | H01M 4/661 429/94 |

FOREIGN PATENT DOCUMENTS

| | | | |
|---|---|---|---|
| JP | 2004-071199 A | | 3/2004 |
| JP | 2004017199 | * | 3/2004 |
| JP | 2005-093145 A | | 4/2005 |
| JP | 2007-073266 A | | 3/2007 |
| JP | 2008-181765 A | | 8/2008 |
| JP | 2008-186725 A | | 8/2008 |
| JP | 4374870 B2 | | 12/2009 |
| JP | 2013-168238 A | | 8/2013 |
| JP | 2013168238 | * | 8/2013 |
| JP | 5709024 B2 | | 4/2015 |

* cited by examiner

ENERGY STORAGE DEVICE

CROSS-REFERENCE TO RELATED APPLICATIONS

This application claims the benefit of Japanese patent applications No. 2015-066953, filed on Mar. 27, 2015, and No. 2016-020707, filed on Feb. 5, 2016, which are incorporated by reference.

FIELD

The present invention relates to an energy storage device which includes an electrode assembly formed by stacking a positive electrode and a negative electrode, and a current collector connected to the electrode assembly.

BACKGROUND

Conventionally, there has been proposed an energy storage device in which stacked electrodes and terminals are joined to each other by clinch joining (see Japanese Patent No. 4374870, for example).

As shown in FIG. 20, the energy storage device includes: a stacked electrode 603 where a plurality of sheet sets each of which is formed of an insulation sheet 600, a positive electrode sheet 601, an insulation sheet 600 and a negative electrode sheet 602 are stacked, and the stacked electrode 603 has stacked layers 604 formed of an electrode foil projecting from a side of the insulation sheets 600; and a terminal 605 joined to the stacked layers 604 formed of an electrode foil.

The terminal 605 has plate portions 606, 607 in two layers, and the stacked layers 604 formed of an electrode foil are sandwiched between the plate portions 606, 607 in two layers of the terminal 605. By plastically deforming the plate portions 606, 607 in two layers, one plate portion 606 and the stacked layers 604 formed of an electrode foil are embedded into the other plate portion 607. With such a configuration, the stacked layers 604 formed of an electrode foil are joined to the terminal 605.

In the above-mentioned energy storage apparatus, a joined portion between the stacked layers 604 formed of an electrode foil and the terminal 605 is formed by contact joining using clinching. Accordingly, a surface of an electrode foil (portion having conductivity) is oxidized with a lapse of time, and electrical resistance of a joined portion between the stacked layers 604 formed of the electrode foil and the terminal 605 is increased. As a result, it becomes difficult to maintain electrical connection at the joined portion between the stacked electrode 603 and the terminal 605 in a favorable state.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage device in which the oxidation of a joined portion between an electrode assembly and a current collector can be suppressed thus maintaining an electrical connection at the joined portion in a favorable state.

An energy storage device according to an aspect of the present invention includes: an electrode assembly including a positive electrode and a negative electrode that are stacked, the positive electrode and the negative electrode respectively including a non-coated region having a metal foil; current collectors each having a support portion which is made to overlap with the non-coated region; and opposedly facing supports each configured to clamp the non-coated region cooperatively with the support portion, wherein at least one of the non-coated region, the support portion and the opposedly facing support includes a conductive layer having non-oxidizing property or hardly-oxidizable property, the conductive layer covering at least one surface out of a surface of the non-coated region facing the support portion, a surface of the non-coated region facing the opposedly facing support, a surface of the support portion facing the non-coated region, and a surface of the opposedly facing support facing the non-coated region.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
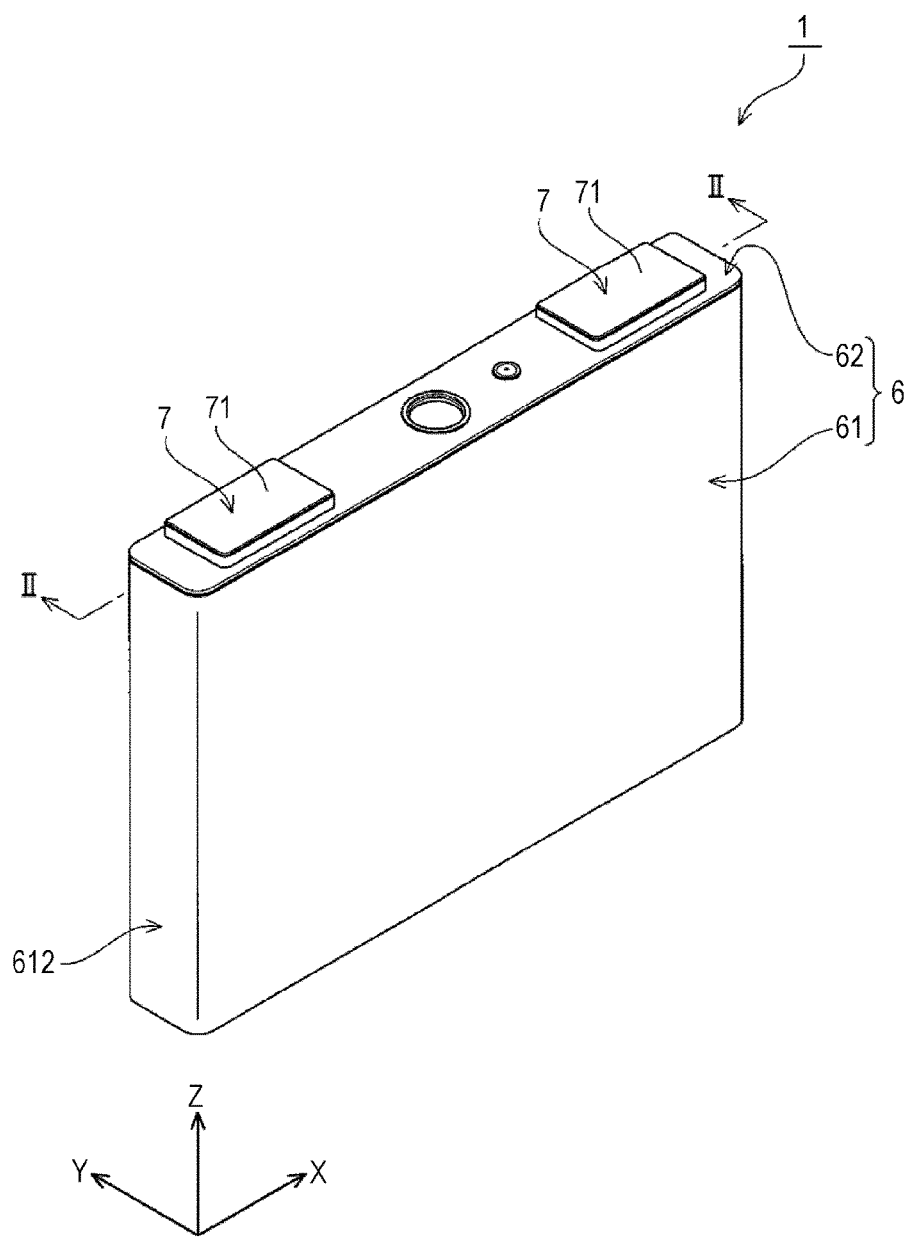
FIG. 1 is a perspective view of an energy storage device according to one embodiment of the present invention.

According to an aspect of the present invention, there is provided an energy storage device which includes: an electrode assembly including a positive electrode and a negative electrode that are stacked, the positive electrode and the negative electrode respectively including a non-coated region having a metal foil; current collectors each having a support portion which is made to overlap with the non-coated region; and oppositely facing supports each configured to clamp the non-coated region cooperatively with the support portion, wherein at least one of the non-coated region, the support portion and the oppositely facing support includes a conductive layer having non-oxidizing property or hardly-oxidizable property, the conductive layer covering at least one surface out of a surface of the non-coated region facing the support portion, a surface of the non-coated region facing the oppositely facing support, a surface of the support portion facing the non-coated region, and a surface of the oppositely facing support facing the non-coated region.

With such a configuration, the non-coated region is clamped by the support portion and the oppositely facing support. Accordingly, in the positive electrode or the negative electrode and the current collector which are in contact joining, the conductive layer covers at least one surface out of the surface of the non-coated region facing the support portion, the surface of the non-coated region facing the oppositely facing support, the surface of the support portion facing the non-coated region, and the surface of the oppositely facing support facing the non-coated region and hence, oxidation of a portion where the conductive layer is formed can be suppressed whereby the increase in resistance between members caused by oxidation of the portion can be suppressed. As a result, an electrical connection in the joined portion between the electrode assembly and the current collector can be maintained in a favorable state.

In the above-mentioned energy storage device, it is preferable that the support portion have a first fitting portion formed of either one of a projecting portion and a recessed portion, the oppositely facing support have a second fitting portion formed of the other of the projecting portion or the recessed portion, the second fitting portion being engaged with the first fitting portion by concavoconvex fitting engagement in a state where the non-coated region is clamped between the first fitting portion and the second fitting portion, and the conductive layer be disposed at a position corresponding to at least the first fitting portion and the second fitting portion.

With such a configuration, the conductive layer is formed at the portion where the first fitting portion and the second fitting portion are engaged with each other by concavoconvex fitting engagement (that is, the portion where overlapping members are brought into close contact with each other by concavoconvex fitting engagement). Accordingly, the oxidation of the surface which is brought into contact with the conductive layer is prevented and hence, an electrical connection is maintained in a favorable state at the portion (the portion where the above-mentioned concavoconvex fitting engagement is made).

In the above-mentioned energy storage device, it is preferable that the projecting portion and the recessed portion which form the first fitting portion and the second fitting portion be portions formed by molding using a male die and a female die, the projecting portion be formed on either one of the support portion and the oppositely facing support, whichever has a larger thickness size, and the recessed portion be formed on either one of the support portion and the oppositely facing support, whichever has a smaller thickness size.

With such a configuration, the portion where the projecting portion is formed has a larger thickness size than the portion where the recessed portion is formed and hence, even when the thickness of the portion is decreased so that strength of the portion is lowered at the time of molding the projecting portion using a die, the portion can ensure a predetermined strength.

In the above-mentioned energy storage device, it is preferable that the above-mentioned non-coated region of either one of the positive electrode and the negative electrode be stacked, and the conductive layer be formed on respective surfaces of the non-coated regions which face each other in an opposed manner in the above-mentioned stacked state.

With such a configuration, the increase in resistance caused by oxidation between the respective non-coated regions in the non-coated regions in a stacked state can be suppressed. Accordingly, an electrical connection between all non-coated regions in the electrode assembly can be maintained in a favorable state.

In the above-mentioned energy storage device, the conductive layer may contain a carbonaceous material.

The conductive layer contains a carbonaceous material in this manner and hence, a favorable conductivity can be ensured between the electrode assembly and the current collector.

In the above-mentioned energy storage device, at least one of the positive electrode and the negative electrode may have the non-coated region and a coated region formed adjacently to the non-coated region, the non-coated region may have a first conductive layer which forms the conductive layer, the coated-region may have: a second metal foil continuously formed with a first metal foil which is a metal foil of the non-coated region; a second conductive layer having non-oxidizing property or hardly-oxidizable property, the second conductive layer being stacked on the second metal foil in a close contact state; and an active material layer stacked on the second conductive layer such that the second conductive layer is sandwiched between the active material layer and the second metal foil, and the first conductive layer and the second conductive layer may be continuously formed with each other.

In this manner, by forming the conductive layer in the coated region (to be more specific, the coated region between the second metal foil and the active material layer) continuously (integrally) until the conductive layer reaches the non-coated region, in addition to the flow of electrons toward the current collector from the active material layer through the metal foil, it is possible to make the flow of electrons directly toward the current collector from the active material layer through the conductive layer. Accordingly, conductivity between the electrode assembly and the current collector can be further enhanced.

In the energy storage device, the conductive layer may cover the whole of at least one surface out of the surface of the non-coated region facing the support portion, and the surface of the non-coated region facing the opposedly facing support.

With such a configuration, the whole of at least one surface of the non-coated region (metal foil) is coated by the conductive layer and hence, oxidation is prevented over the whole surface whereby conductivity between the electrode assembly and the current collector can be further enhanced.

In the energy storage device, the positive electrode and the negative electrode respectively may include: the metal foil; and an active material layer stacked on the metal foil in regions of the metal foil except for the non-coated region, and the conductive layer may cover the whole surface of the metal foil facing the active material layer between the metal foil and the active material layer.

With such a configuration, the oxidation of the whole surface of the metal foil facing the active material layer can be prevented. Further, in addition to the flow of electrons toward the current collector from the active material layer through the metal foil, it is possible to make the larger flow of electrons directly toward the current collector from the active material layer through the conductive layer. Accordingly, conductivity between the electrode assembly and the current collector can be further enhanced.

Further, the positive electrode and the negative electrode may be wound in a stacked state in the electrode assembly, and the non-coated region may be disposed at an end portion of the electrode assembly in a winding center axis direction.

Even in a so-called winding-type electrode assembly where the positive electrode and the negative electrode are wound in a stacked state, at the end portion in the winding center axis direction, the increase in resistance between the members caused by oxidation can be suppressed and hence, an electrical connection at the joined portion between the electrode assembly and the current collector can be maintained in a favorable state.

As has been described above, according to the energy storage device of the present invention, it is possible to maintain an electrical connection between a current collector and an electrode assembly in a favorable state by suppressing the oxidation of the electrode assembly which is connected with a current collector.

Hereinafter, one embodiment of an energy storage device according to the present invention is described with reference to FIG. 1 to FIG. 16. As the energy storage device, a primary battery, a secondary battery, a capacitor and the like are named. In this embodiment, as one example of the energy storage device, a chargeable and dischargeable secondary battery is described. Names of respective constitutional members (respective constitutional elements) in this embodiment are used only for this embodiment, and may differ from names of respective constitutional members (respective constitutional elements) in BACKGROUND.

The energy storage device of this embodiment is a non-aqueous electrolyte secondary battery. To be more specific, the energy storage device is a lithium ion secondary battery which makes use of the electron transfer brought about by the movement of lithium ion. Such a kind of energy storage device supplies electric energy. The energy storage device is used in a single form or in a plural form. To be more specific, when required output and required voltage are small, the energy storage device is used in a single form. On the other hand, when at least one of required output and required voltage is large, the energy storage device is used for an energy storage apparatus in combination with another energy storage device. In the energy storage apparatus, the energy storage devices used for the energy storage apparatus supply electric energy.

As shown in FIG. 1 to FIG. 9 and FIG. 14, the energy storage device includes: an electrode assembly 2 which includes a positive electrode 23 and a negative electrode 24 which are stacked onto each other and have a non-coated region 23A, 24A made of a metal foil 231A, 241A, respectively, in a state where the non-coated region 23A, 24A of either one of the positive electrode 23 and the negative electrode 24 projects from an edge of the other of the positive electrode 23 and the negative electrode 24; current collectors 3 each having support portions 35 which are made to overlap with the non-coated region 23A, 24A; and opposedly facing supports 41 each of which clamps the non-coated region 23A, 24A with the support portion 35. At least one of the non-coated regions 23A, 24A, the support portions 35, and the opposedly facing support 41 includes a first conductive layer 232A, 242A which has a non-oxidizing property or a hardly oxidizable property and covers (preferably covers in a close contact state) at least one of a surface facing the support portion 35 and a surface facing the opposedly facing support 42 in the non-coated region 23A, 24A, a surface facing the non-coated region 23A, 24A in the support portion 35, and a surface facing the non-coated region 23A, 24A in the opposedly facing support 42.

As shown in FIG. 1 to FIG. 4, the energy storage device 1 includes: a case 6 which houses the electrode assembly 2 therein; external terminals 7 which are arranged outside the case 6; and current collectors 3 which make the electrode assembly 2 and the external terminal 7 conductive with each other. That is, the energy storage device 1 of this embodiment includes the case 6, the electrode assembly 2 which is housed in the case 6, the external terminals 7 which are arranged outside the case 6, and the current collectors 3 which connect the electrode assembly 2 and the external terminal 7 with each other in a conductive manner.

The case 6 includes a case body 61 having an opening, and a lid plate 62 which closes the opening of the case body 61. The case 6 stores an electrolyte solution in an inner space 63 together with the electrode assembly 2, the current collectors 3 and the like. The case 6 is made of metal having a resistance to the electrolyte solution. The case 6 in this embodiment is made of an aluminum-based metal material such as aluminum or an aluminum alloy, for example. The case 6 may be made of a metal material such as stainless steel or nickel, a composite material obtained by adhering to a resin such as nylon to aluminum or the like.

The case body 61 includes a plate-shape closing portion 611, and a cylindrical barrel portion 612 which is connected to a peripheral edge of the closing portion 611.

The closing portion 611 is positioned at a lower end of the case body 61 when the case body 61 is arranged such that the opening faces upward (that is, a portion forming a bottom wall of the case body 61 when the opening faces upward). The closing portion 611 has a rectangular shape as viewed in a normal direction of the closing portion 611. Further, the barrel portion 612 has a prismatic cylindrical shape. The barrel portion 612 in this embodiment has a flat prismatic cylindrical shape. As described above, the case body 61 has a prismatic cylindrical shape where one end portion in the opening direction is closed (that is, a bottomed prismatic cylindrical shape).

Figure 3:
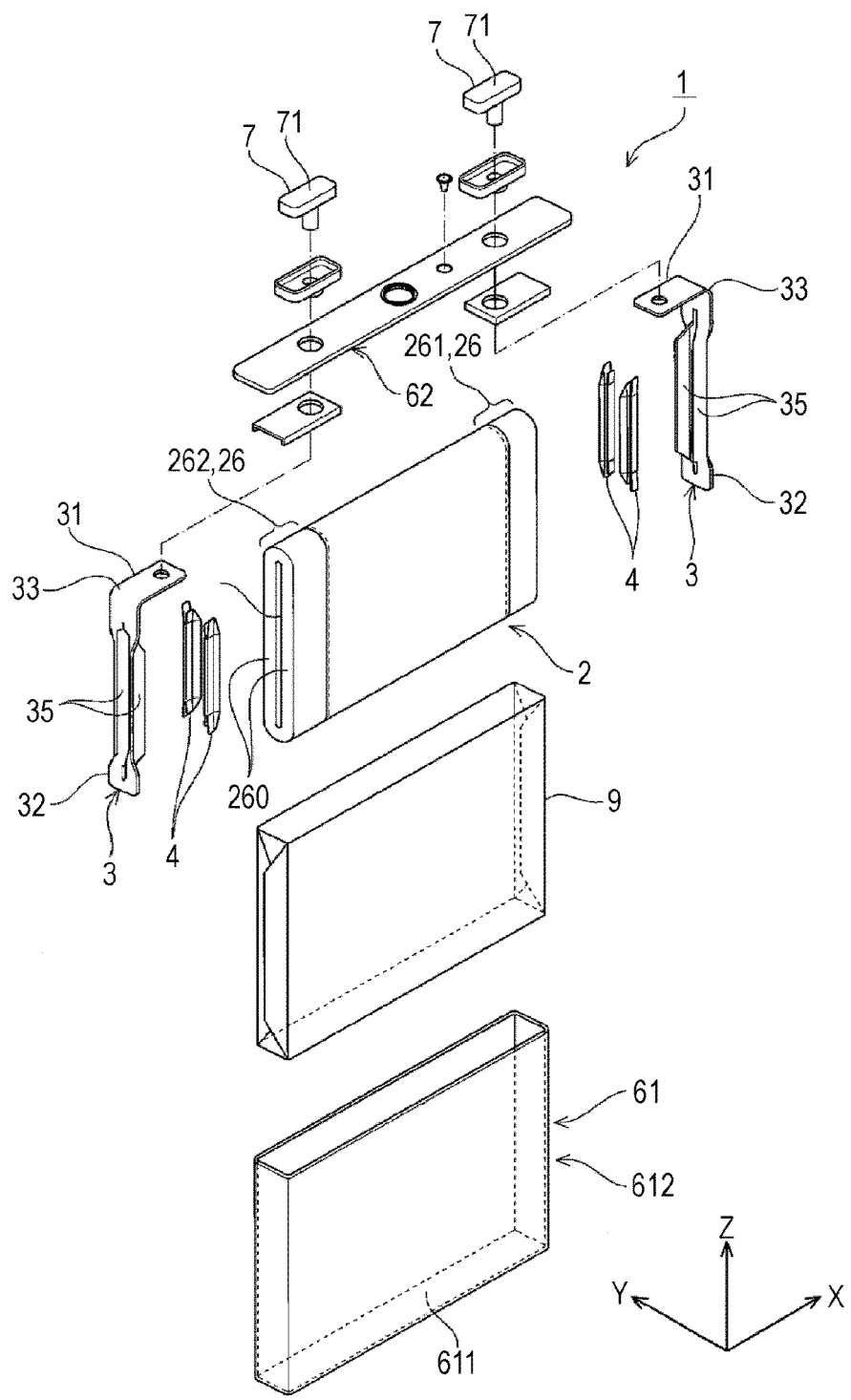
FIG. 3 is an exploded perspective view of the energy storage device.

Hereinafter, as shown in FIG. 3, a long side direction of the closing portion 611 is assumed as an X axis direction in orthogonal coordinate axes, a short side direction of the closing portion 611 is assumed as a Y axis direction in the orthogonal coordinate axes, and a normal direction of the closing portion 611 is assumed as a Z axis direction in the orthogonal coordinate axes.

Figure 5:
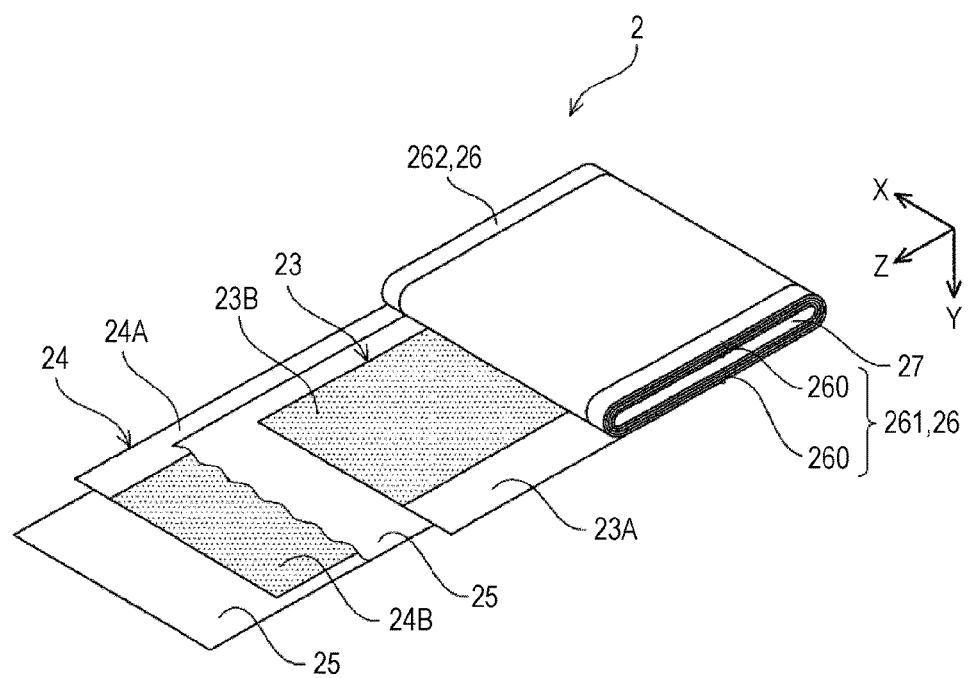
FIG. 5 is a view describing a configuration of the electrode assembly of the energy storage device.

As shown in FIG. 5, the electrode assembly 2 is formed by winding a stacked body where the positive electrode 23 and the negative electrode 24 are stacked onto each other in an insulated manner. That is, the electrode assembly 2 in this embodiment is of a so-called winding type. The electrode assembly 2 in this embodiment has a flat cylindrical shape.

The positive electrode 23 has a metal foil 231, a conductive layer 232 stacked on the metal foil 231, and a positive active material layer 233 stacked on the conductive layer 232. In this manner, the positive electrode 23 has a three-layered structure constituted of the metal foil 231, the conductive layer 232, and the positive active material layer 233.

Figure 6:
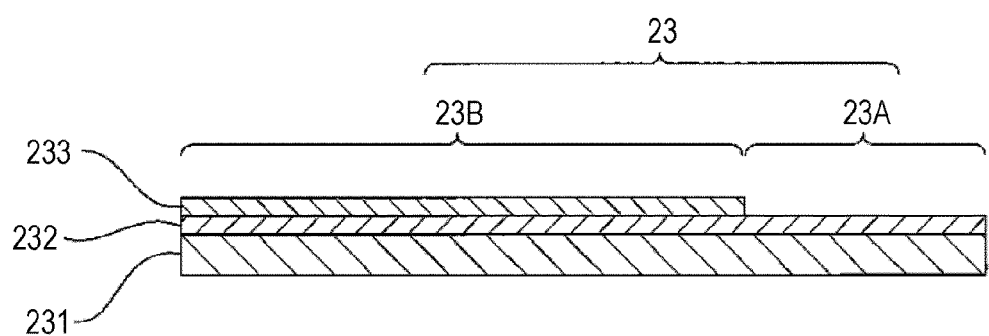
FIG. 6 is an enlarged cross-sectional view of a positive electrode which forms a part of the electrode assembly.
Figure 7:
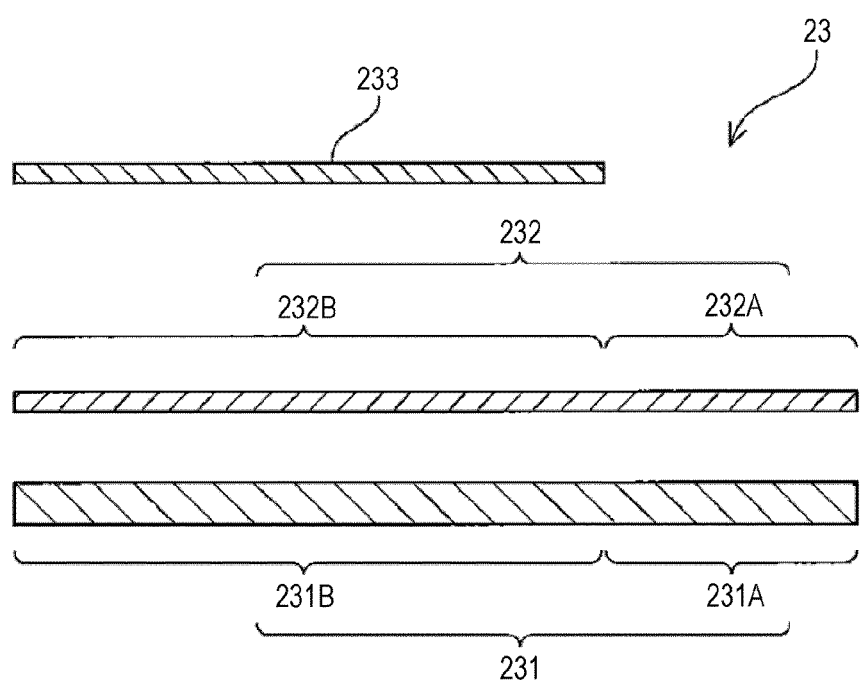
FIG. 7 is an exploded view describing the configuration of the positive electrode.

As shown in FIG. 6 and FIG. 7, the positive electrode 23 has a non-coated region 23A, and a coated region 23B which is continuously formed with the non-coated region 23A. The non-coated region 23A means a region of the positive electrode 23 where the active material layer 233 is not stacked on the metal foil 231. The coated region 23B means a region of the positive electrode 23 where the active material layer 233 is stacked on the metal foil 231. The non-coated region 23A has a first metal foil 231A, and a first conductive layer 232A which is stacked on the first metal foil 231A. The coated region 23B has a second metal foil 231B which is continuously formed with (continuously connected to) the first metal foil 231A, a second conductive layer 232B which is stacked on the second metal foil 231B in a close contact state and has non-oxidizing property or hardly-oxidizable property, and a positive active material layer (active material layer) 233 which is stacked on the second conductive layer 232B so as to sandwich the second conductive layer 232B between the positive active material layer 233 and the second metal foil 231B. In the positive electrode 23 in this embodiment, the first metal foil 231A and the second metal foil 231B are integrally formed (continuously formed with each other) thus constituting the metal foil 231. The first conductive layer 232A and the second conductive layer 232B are integrally formed (continuously formed with each other) thus constituting the conductive layer 232.

In the positive electrode 23 in this embodiment, a portion in a lateral direction where the positive active material layer 233 is stacked is the above-mentioned coated region 23B, and a portion in a lateral direction where the positive active material layer 233 is not stacked is the above-mentioned non-coated region 23A. A portion of the metal foil 231 included in the non-coated region 23A is the above-mentioned first metal foil 231A, and a portion of the metal foil 231 included in the coated region 23B is the above-mentioned second metal foil 231B. A portion of the conductive layer 232 included in the non-coated region 23A is the above-mentioned first conductive layer 232A, and a portion of the conductive layer 232 included in the coated region 23B is the above-mentioned second conductive layer 232B.

The metal foil 231 has a strip shape. In the metal foil 231, a width in a lateral direction (a direction orthogonal to a longitudinal direction) is constant or is substantially constant at any positions in the longitudinal direction. The metal foil 231 in this embodiment is made of aluminum, for example.

The conductive layer 232 is a layer made of a conductive material having non-oxidizing property or hardly-oxidizable property, and is formed (stacked) on the whole region of a surface on one side (an upper surface in FIG. 6 and FIG. 7) of the metal foil 231. The conductive layer 232 includes at least a conductive material having non-oxidizing property or hardly-oxidizable property. The material having non-oxidizing property means a material which does not generate an oxidation reaction under an air atmosphere or under an electrolyte solution atmosphere. The material having hardly-oxidizable property means a material where an oxidation reaction hardly occurs compared to the metal foil 231 in the non-coated region 23A, a support portion 35 described later, and an oppositely facing support 41 described later under an air atmosphere or under an electrolyte solution atmosphere. It is preferable that the material having hardly-oxidizable property have a smaller standard enthalpy of formation of an oxide than the metal foil 231 in the non-coated region 23A, the support portion 35 described later, and the oppositely facing support 41 described later under an air atmosphere or under an electrolyte solution atmosphere. The conductive material having non-oxidizing property or hardly-oxidizable property is a carbonaceous material, a conductive resin, or metal having a low ionization tendency, for example. As a carbonaceous material, carbon black or graphite can be named, for example. As the conductive resin, a material obtained by mixing carbon black or the like into an epoxy resin or a polyolefin resin can be named, for example. As the metal having a low ionization tendency, noble metal can be named, for example. The conductive layer 232 in this embodiment includes (contains) carbon black as the conductive material. The conductive layer 232 in this embodiment is formed by preparing a material by dispersing polyvinylidene fluoride and carbon black which functions as a binding agent into a solvent, by applying the material to the metal foil 231 by coating and, thereafter, by drying the material.

The positive active material layer 233 is formed (stacked) on the metal foil 231 (to be more specific, the conductive layer 232) while leaving one end portion (a right side in FIG. 6 and FIG. 7) of the strip-shaped metal foil 231 in the lateral direction in a state where the positive active material layer 233 is not formed.

The positive active material layer 233 contains at least a positive active material and a binder.

The positive active material is a lithium metal oxide, for example. To be more specific, for example, the positive active material is a composite oxide ($LiaCoyO_2$, $LiaNixO_2$, $LiaMnzO_4$, $LiaNixCoyMnzO_2$ or the like) expressed by LiaMebOc (Me expressing one, two or more transition metals) or a polyanion compound ($LiaFebPO_4$, $LiaMnbPO_4$, $LiaMnbSiO_4$, $LiaCobPO_4F$ or the like) expressed by LiaMeb(XOc)d (Me expressing one, two or more transition metals, and X expressing P, Si, B, V, for example). The positive active material in this embodiment is $LiNi_{1/3}Co_{1/3}Mn_{1/3}O_2$.

The binder used for forming the positive active material layer 233 is polyvinylidene fluoride (PVdF), a copolymer of ethylene and vinyl alcohol, polymethyl methacrylate, polyethylene oxide, polypropylene oxide, polyvinyl alcohol, polyacrylate, polymethacrylate, or styrene-butadiene rubber (SBR), for example. The binder used in this embodiment is polyvinylidene fluoride.

The positive active material layer 233 may further contain a conductive auxiliary agent such as Ketjenblack (registered trademark), acetylene black or graphite. The positive active material layer 233 in this embodiment contains acetylene black as the conductive auxiliary agent.

The negative electrode 24 has a metal foil 241, a conductive layer 242 formed on the metal foil 241, and a negative active material layer 243 formed on the conductive layer 242. In this manner, the negative electrode 24 also has a three-layered structure in the same manner as the positive electrode 23.

Figure 8:
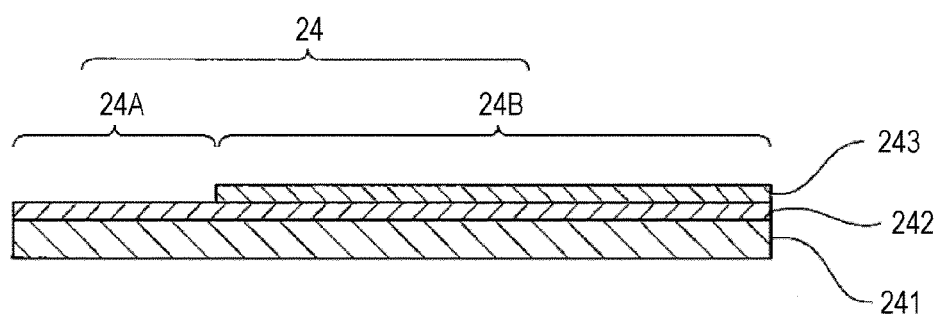
FIG. 8 is an enlarged cross-sectional view of a negative electrode which forms a part of the electrode assembly.
Figure 9:
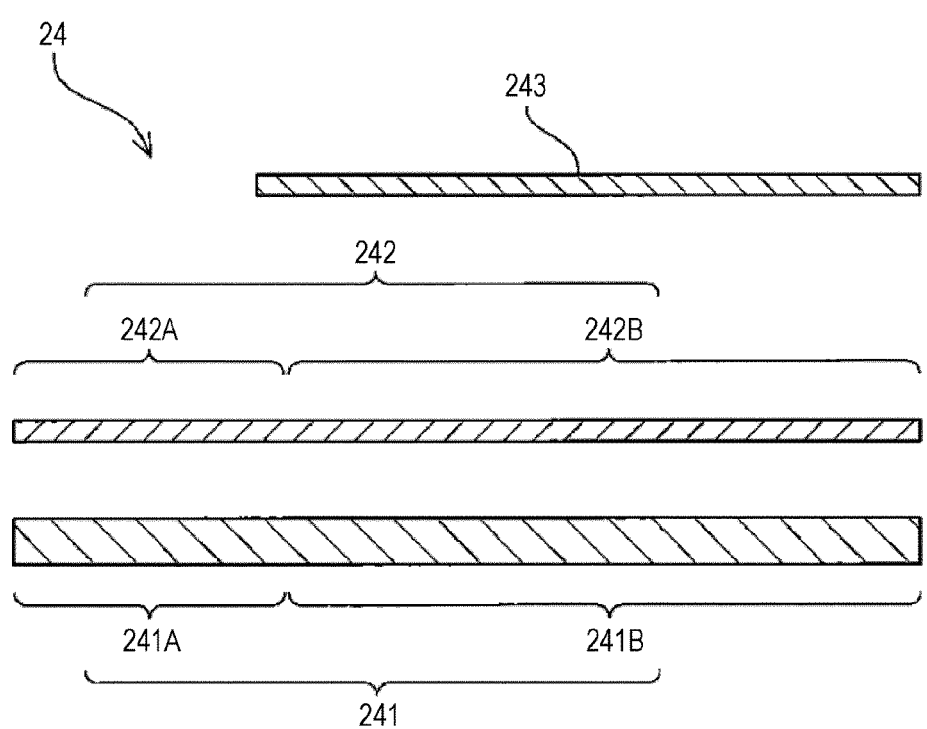
FIG. 9 is an exploded view describing the configuration of the negative electrode.
Figure 10:
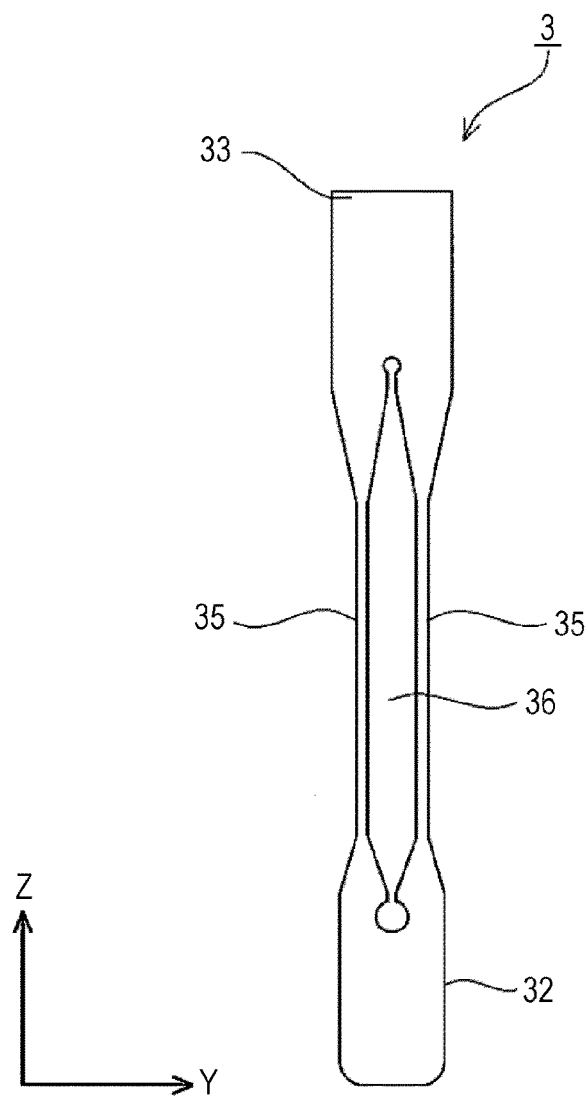
FIG. 10 is a side view of a current collector of the energy storage device.
Figure 11:
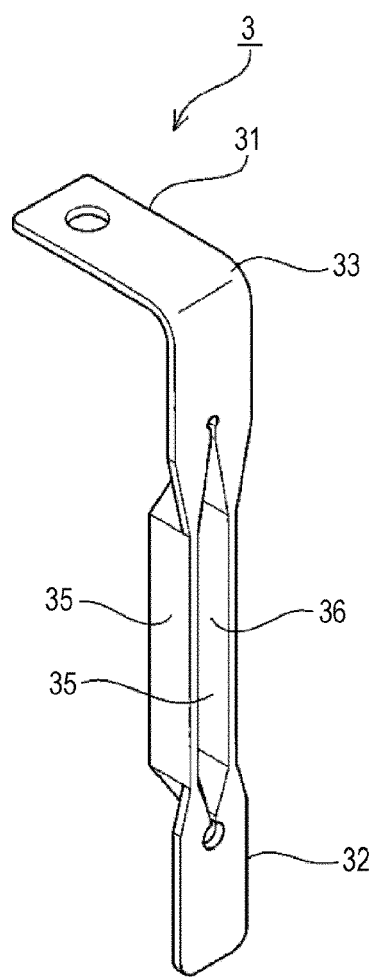
FIG. 11 is a perspective view of the current collector.
Figure 11:
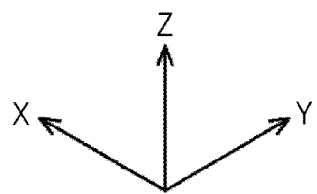
Figure 12:
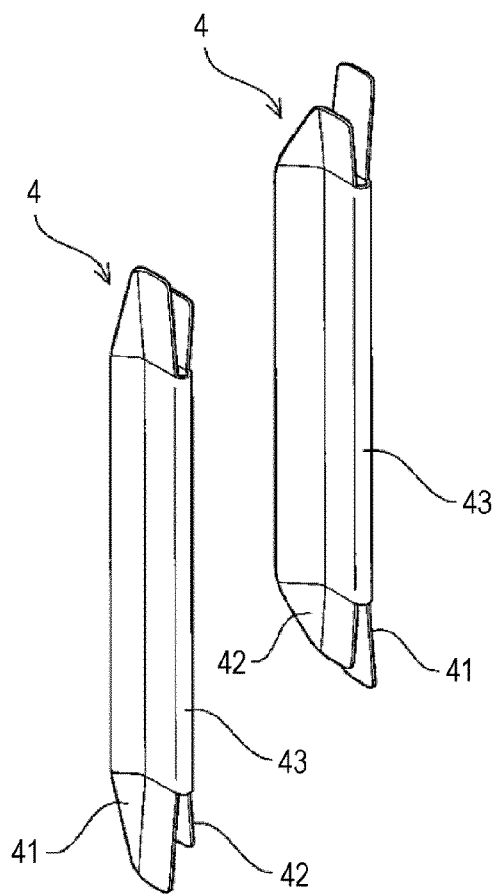
FIG. 12 is a perspective view of clip members of the energy storage device.
Figure 12:
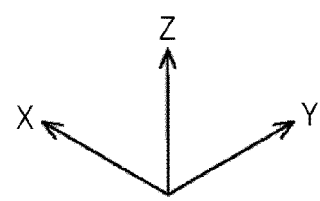
Figure 13:
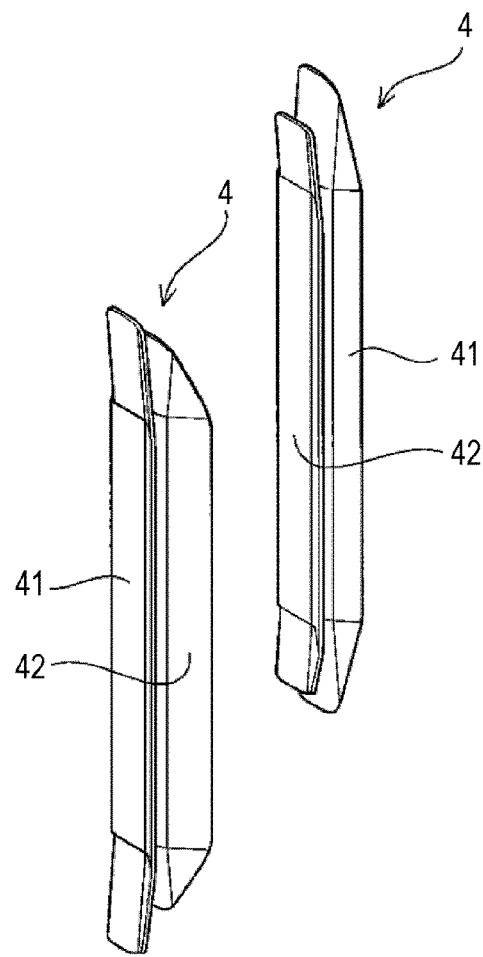
FIG. 13 is a perspective view of the clip members.

As shown in FIG. 8 and FIG. 9, the negative electrode 24 has a non-coated region 24A, and a coated region 24B which is continuously formed with the non-coated region 24A. The non-coated region 24A has a first metal foil 241A, and a first conductive layer 242A which is stacked on the first metal foil 241A. Further, the coated region 24B has a second metal foil 241B which is continuously formed with (continuously connected to) the first metal foil 241A, a second conductive layer 242B which is stacked on the second metal foil 241B in a close contact state and has non-oxidizing property or hardly-oxidizable property, and a negative active material layer (active material layer) 243 which is stacked on the second conductive layer 242B so as to sandwich the second conductive layer 242B between the negative active material layer 243 and the second metal foil 241B. In this embodiment, the first metal foil 241A and the second metal foil 241B are integrally formed (continuously formed with each other) thus constituting the metal foil 241. Further, the first conductive layer 242A and the second conductive layer 242B are integrally formed (continuously formed with each other) thus constituting the conductive layer 242.

In the negative electrode 24 in this embodiment, a portion in the lateral direction where the negative active material layer 243 is stacked is the above-mentioned coated region 24B, and a portion in the lateral direction where the negative active material layer 243 is not stacked is the above-mentioned non-coated region 24A. Further, a portion of the metal foil 241 included in the non-coated region 24A is the above-mentioned first metal foil 241A, and a portion of the metal foil 241 included in the coated region 24B is the above-mentioned second metal foil 241B. Further, a portion of the conductive layer 242 included in the non-coated region 24A is the above-mentioned first conductive layer 242A, and a portion of the conductive layer 242 included in the coated region 24B is the above-mentioned second conductive layer 242B. A width (a size in the lateral direction) of the coated region 24B of the negative electrode 24 is larger than a width of the coated region 23B of the positive electrode 23.

The metal foil 241 has a strip shape. A width of the metal foil 241 in a lateral direction (a direction orthogonal to a longitudinal direction) is fixed or is substantially fixed at respective positions in the longitudinal direction. The metal foil 241 in this embodiment is made of copper, for example.

The conductive layer 242 is a layer made of a conductive material having non-oxidizing property or hardly-oxidizable property, and is formed (stacked) on the whole region of a surface on one side (an upper surface in FIG. 8 and FIG. 9) of the metal foil 241. The conductive layer 242 includes at least a conductive material having non-oxidizing property or hardly-oxidizable property. The material having non-oxidizing property means a material which does not generate an oxidation reaction under an air atmosphere or under an electrolyte solution atmosphere. The material having hardly-oxidizable property means a material where oxidation reaction hardly occurs compared to the metal foil 241 in the non-coated region 24A, the support portion 35 described later, and the oppositely facing support 41 described later under an air atmosphere or under an electrolyte solution atmosphere. With respect to the material having hardly-oxidizable property, it is preferable that a standard production enthalpy of an oxide be smaller than that of the metal foil 241 in the non-coated region 24A, the support portion 35 described later, and the oppositely facing support 41 described later under an air atmosphere or under an electrolyte solution atmosphere. The conductive material having non-oxidizing property or hardly-oxidizable property is a carbonaceous material, a conductive resin, or metal having a low ionization tendency, for example. As the carbonaceous material, carbon black or graphite can be named, for example. As the conductive resin, a material obtained by mixing carbon black or the like into an epoxy resin or a polyolefin resin can be named, for example. The conductive layer 242 in this embodiment includes (contains) carbon black as the conductive material in the same manner as the conductive layer 232 of the positive electrode 23. The conductive layer 242 in this embodiment is formed by applying a material obtained by dispersing polyvinylidene fluoride and carbon black which functions as a binding agent into a solvent to the metal foil 241 by coating and, thereafter, by drying such a material.

The negative active material layer 243 is formed (stacked) on the metal foil 241 (to be more specific, the conductive layer 242) while leaving the other end portion (a left side in FIG. 8 and FIG. 9) of the strip-shaped metal foil 241 in the lateral direction in a state where the negative active material layer 243 is not formed.

The negative active material layer 243 contains at least a negative active material and a binder.

The negative active material is, for example, a carbon material such as graphite, hardly graphitizable carbon, easily graphitizable carbon or the like or a material such as silicon (Si) or tin (Sn) which generates an alloying reaction with lithium ion. The negative active material in this embodiment is graphite.

The binder used for forming the negative active material layer 243 is substantially equal to the binder used for forming the positive active material layer 233. The binder in this embodiment is polyvinylidene fluoride.

The negative active material layer 243 may further contain a conductive auxiliary agent such as Ketjenblack (registered trademark), acetylene black or graphite. The negative active material layer 243 in this embodiment does not contain a conductive auxiliary agent.

In the positive electrode 23 and the negative electrode 24 having the above-mentioned configuration, it is preferable that tensile elongation rate of the metal foil 231, 241 in the non-coated region 23A, 24A be larger than tensile elongation rate of the metal foil 231, 241 in the coated region 23B, 24B. With such a configuration, for example, when clinch joining (clinching) of the metal foil 231, 241 in the non-coated region 23A, 24A is performed, since the tensile elongation rate of the metal foil 231, 241 is large, it is possible to suppress the breakage of the metal foil 231, 241 brought about by insufficient elongation of the metal foil 231, 241.

Further, in the positive electrode 23 and the negative electrode 24, it is preferable that the metal foil 231, 241 in the non-coated region 23A, 24A be annealed. With such a configuration, since the metal foil 231, 241 is annealed, when clinch joining of the metal foil 231, 241 in the non-coated region 23A, 24A is performed, it is possible to suppress the breakage of the metal foil 231, 241 brought about by insufficient elongation of the metal foil 231, 241. Here, there is no problem even when the metal foil 231, 241 in the coated region 23B, 24B is annealed.

As shown in FIG. 5, in the electrode assembly 2 in this embodiment, the positive electrode 23 and the negative electrode 24 having the above-mentioned configuration are wound together in a state where the positive electrode 23 and the negative electrode 24 are insulated from each other by the separator 25. The separator 25 is a member having insulating property. The separator 25 is arranged between the positive electrode 23 and the negative electrode 24. With such a configuration, the positive electrode 23 and the negative electrode 24 are insulated from each other in the electrode assembly 2. Further, the separator 25 retains an electrolyte solution in the inside of the case 6. With such a configuration, at the time of performing charging or discharging of the energy storage device 1, lithium ions can move between the positive electrode 23 and the negative electrode 24 which are alternately stacked onto each other with the separator 25 interposed therebetween.

The separator 25 has a strip shape. The separator 25 is formed of a porous film made of polyethylene, polypropylene, cellulose, polyamide or the like, for example. The separator 25 may be configured by forming an inorganic layer containing inorganic particles such as $SiO_2$ particles, $Al_2O_3$ particles, boehmite (hydrated alumina) on a substrate formed of a porous film. The separator 25 in this embodiment is made of polyethylene, for example.

A width (a size in the lateral direction of a strip shape) of the separator is slightly larger than a width of the coated region 24B of the negative electrode 24. The separator 25 is arranged between the positive electrode 23 and the negative electrode 24 which are made to overlap with each other in a displaced manner in a widthwise direction such that the coated regions 23B, 24B are made to overlap with each other. Here, the non-coated region 23A of the positive electrode 23 and the non-coated region 24A of the negative electrode 24 do not overlap with each other. That is, the non-coated region 23A of the positive electrode 23 projects in the widthwise direction from a region (the edge of the negative electrode 24) where the positive electrode 23 and the negative electrode 24 overlap with each other, and the non-coated region 24A of the negative electrode 24 projects in the widthwise direction (in the direction opposite to the projecting direction of the non-coated region 23A of the positive electrode 23) from the region (the edge of the positive electrode 23) where the positive electrode 23 and the negative electrode 24 overlap with each other. The electrode assembly 2 is formed by winding the positive electrode 23, the negative electrode 24, and the separator 25 which are stacked onto each other as described above into a flat cylindrical shape. With such a configuration, the non-coated region 23A of the positive electrode 23 projects in the X axis direction from the edge of the negative electrode 24 (to be more specific, an edge of the coated region 24B) in a stacked state. The non-coated region 24A of the negative electrode 24 projects in the X axis direction (a direction opposite to the projecting direction of the non-coated region 23A of the positive electrode 23) from the edge of the positive electrode 23 (to be more specific, an edge of the coated region 23B) in a stacked state. Hereinafter, portions which project in the X axis direction from a portion where the coated regions 23B, 24B are stacked onto each other in the Y axis direction and where the non-coated regions 23A, 24A are stacked are referred to as projecting portions 26. To be more specific, the portion where the non-coated region 23A of the positive electrode 23 is stacked may be referred to as a positive electrode projecting portion 261, and a portion where the non-coated region 24A of the negative electrode 24 is stacked may be referred to as a negative electrode projecting portion 262.

The projecting portion 26 is a portion of the electrode assembly 2 which is made conductive with the current collector 3. The projecting portion 26 in this embodiment is split into two portions (two-split projecting portions) 260 with a hollow portion 27 (see FIG. 3) interposed therebetween as viewed in a direction toward the winding center of the positive electrode 23, the negative electrode 24 and the separator 25 which are wound together (as viewed in the X axis direction). On surfaces of the projecting portions 26 on a side where the projecting portions 26 opposedly face the hollow portion 27 (to be more specific, respective surfaces of the two-split projecting portions 260), the above-mentioned conductive layer 232, 242 (to be more specific, the first conductive layer 232A, 242A) is formed respectively.

The projecting portion 26 having the above-mentioned configuration is provided to the respective electrodes of the electrode assembly 2. That is, the projecting portion 26 where only the non-coated region 23A of the positive electrode 23 is stacked forms the positive electrode projecting portion 261 of the electrode assembly 2, and the projecting portion 26 where only the non-coated region 24A of the negative electrode 24 is stacked forms the negative electrode projecting portion 262 of the electrode assembly 2.

Figure 2:
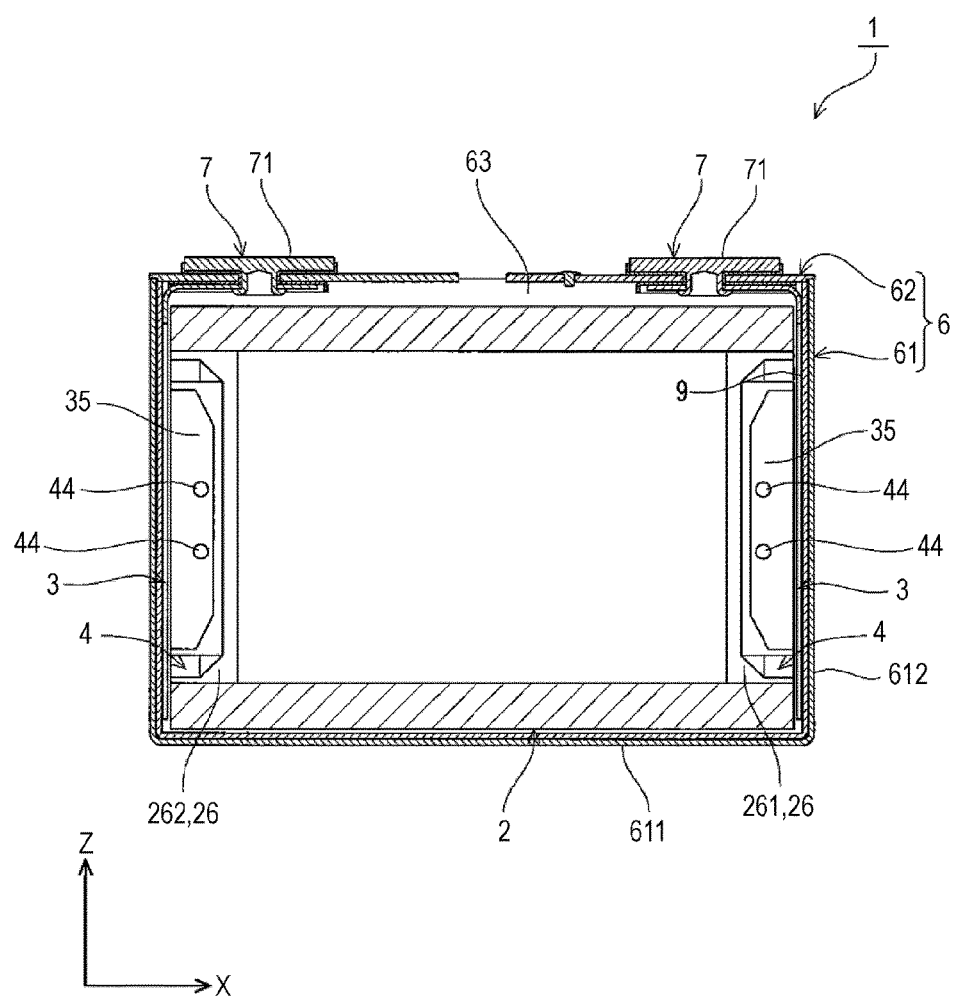
FIG. 2 is a cross-sectional view taken along a line II-II in FIG. 1.
Figure 4:
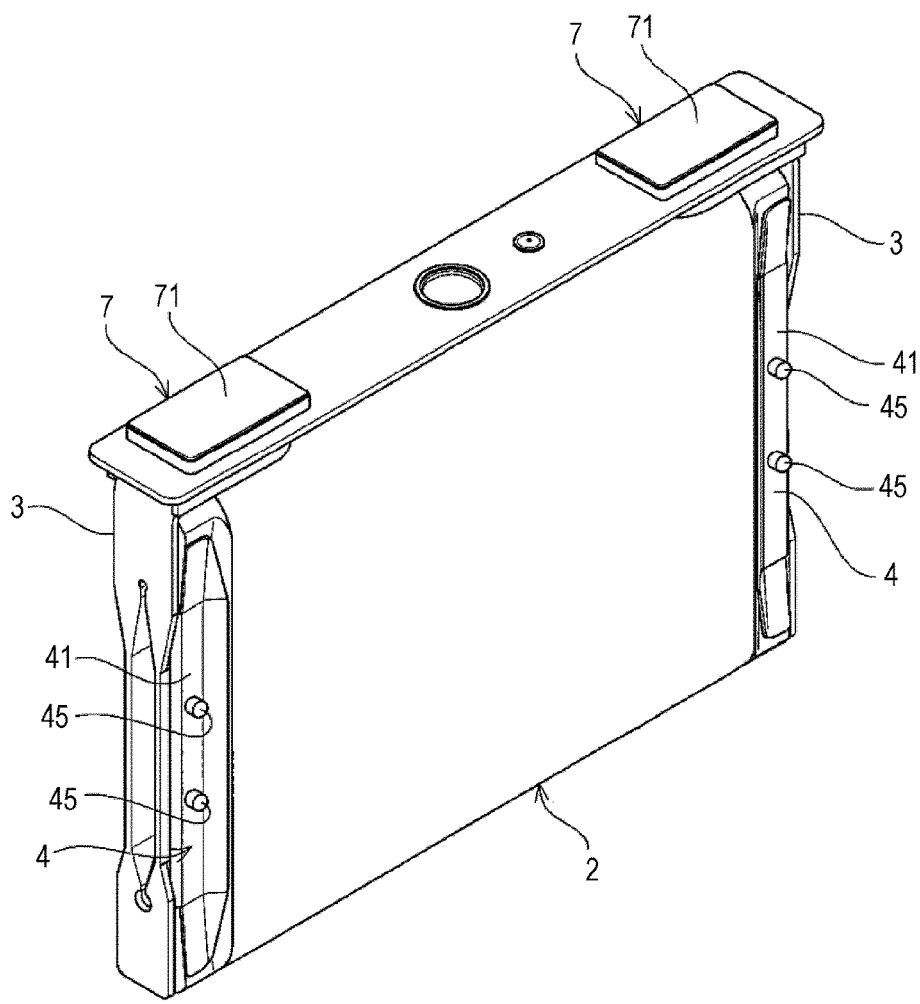
FIG. 4 is a perspective view showing a state where parts of the energy storage device are assembled together, and is a perspective view showing a state where an electrode assembly, current collectors, and external terminals are assembled to a lid plate.

As shown in FIG. 2 to FIG. 4, the current collectors 3 are arranged in the inside of the case 6, and are directly or indirectly connected with the electrode assembly 2 in a conductive manner. The current collectors 3 in this embodiment are connected with the electrode assembly 2 in a conductive manner by way of clip members 4. That is, the energy storage device 1 includes the clip members 4 each of which connects the electrode assembly 2 and the current collector 3 to each other in a conductive manner.

The current collector 3 is formed of a member having conductivity. The current collector 3 is disposed along an inner surface of the case 6 (see FIG. 2). The current collector 3 in this embodiment connects the external terminal 7 and the clip member 4 to each other in a conductive manner. To be more specific, as shown in FIG. 2 to FIG. 4, FIG. 10 and FIG. 11, the current collector 3 includes: a first connecting portion 31 which is connected with the external terminal 7 in a conductive manner; a second connecting portion 32 which is connected with the electrode assembly 2 in a conductive manner; and a bent portion 33 which connects the first connecting portion 31 and the second connecting portion 32 to each other. In the current collector 3, the bent portion 33 is arranged in the vicinity of a boundary between the lid plate 62 and the case body 61 in the inside of the case 6, the first connecting portion 31 extends from the bent portion 33 along the lid plate 62, and the second connecting portion 32 extends from the bent portion 33 along the case body 61.

The first connecting portion 31 is a portion connected with the external terminal 7 in a conductive manner. To be more specific, the first connecting portion 31 extends from the bent portion 33 along the inner surface of the case 6 (the lid plate 62) in a state where the first connecting portion 31 is insulated from the case 6 (to be more specific, the lid plate 62). The first connecting portion 31 is a plate-shape portion. The external terminal 7 is connected to a distal end portion of the first connecting portion 31.

The second connecting portion 32 is connected with the electrode assembly 2 (in this embodiment, the projecting portion 26 of the electrode assembly 2 by way of the clip member 4) in a conductive manner. To be more specific, the second connecting portion 32 extends from the bent portion 33 along the inner surface of the case 6 in a state where the second connecting portion 32 is insulated from the case 6 (to be more specific, the case body 61). The second connecting portion 32 has at least one support portion 35 which extends toward the projecting portion 26 from an area in the vicinity of the inner surface of the case 6 (the case body 61) and also extends in the same direction as the second connecting portion 32. The support portion 35 is joined to the clip member 4 (by clinch joining in an example of this embodiment).

The second connecting portion 32 in this embodiment has two support portions 35. To be more specific, the second connecting portion 32 includes two support portions 35 which respectively extend in the Z axis direction on both sides of the opening 36 so as to define the opening 36 formed at the center of the second connecting portion 32 in the Y axis direction. That is, the second connecting portion 32 includes: one support portion 35 which is joined to one clip member 4 clamping one of two-split projecting portions 260 of each projecting portion 26; and the other support portion 35 which is joined to the other clip member 4 clamping the other of two-split projecting portions 260. The opening 36 and two support portions 35 can be formed by forming a cut extending in the Z axis direction (a longitudinal direction) in a strip-shaped plate before the second connecting portion 32 is formed on the strip-shaped plate and by twisting portions of the strip-shaped plate disposed on both sides of the cut.

Figure 14:
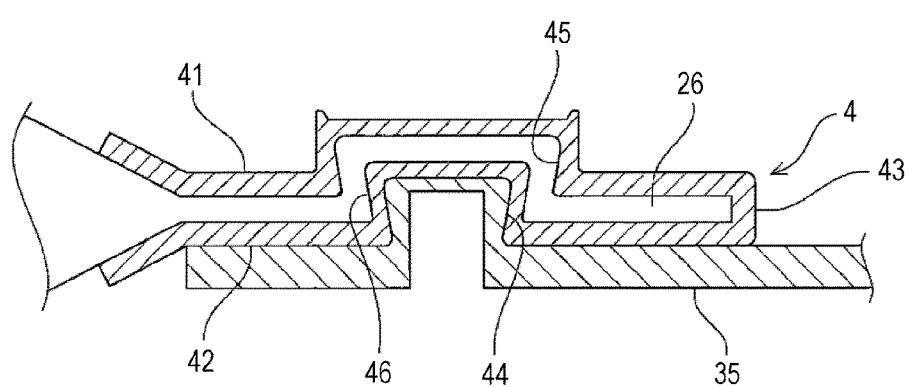
FIG. 14 is an enlarged cross-sectional view of a joint portion between the electrode assembly and the current collector of the energy storage device.
Figure 14:
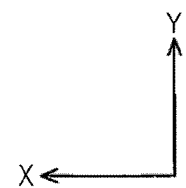

The support portion 35 has first fitting portions 44 formed of either one of a projecting portion and a recessed portion (see FIG. 2 and FIG. 14). The support portion 35 is disposed such that the support portion 35 overlaps with the projecting portion 26 (a portion where the non-coated region 23A, 24A is stacked) of the electrode assembly 2. The support portion 35 in this embodiment includes the first fitting portions 44 formed of a projecting portion, and is disposed such that the support portion 35 overlaps with the projecting portion 26 with the clip member 4 interposed between the support portion 35 and the projecting portion 26. The first fitting portion 44 is formed at the time of joining the support portion 35 and the projecting portion 26 to each other. Accordingly, the first fitting portions 44 are not formed on the support portion 35 before the support portion 35 is joined with the projecting portion 26 shown in FIG. 3, FIG. 10 and FIG. 11.

The current collector 3 having the above-mentioned configuration is disposed on a positive electrode side and a negative electrode side of the energy storage device 1 respectively. To be more specific, in the inside of the case 6, the current collectors 3 are disposed at a position adjacent to the positive electrode projecting portion 261 of the electrode assembly 2 and at a position adjacent to the negative electrode projecting portion 262 of the electrode assembly 2 respectively.

The current collector 3 for the positive electrode 23 and the current collector 3 for the negative electrode 24 are made of different materials. To be more specific, the current collector 3 for the positive electrode 23 is made of aluminum or an aluminum alloy, for example, and the current collector 3 for the negative electrode 24 is made of copper or a copper alloy, for example. That is, the support portions 35 for the positive electrode 23 are also made of aluminum or an aluminum alloy, and the support portions 35 for the negative electrode 24 are also made of copper or a copper alloy.

The clip member 4 sandwiches the positive electrodes 23 or the negative electrodes 24 (to be more specific, the stacked non-coated regions 23A, 24A) which are stacked at the projecting portion 26 (to be more specific, the two-split projecting portion 260) of the electrode assembly 2 in bundle. With such a configuration, the clip member 4 makes the positive electrodes 23 (to be more specific, the stacked non-coated regions 23A) or the negative electrodes 24 (to be more specific, the stacked non-coated regions 24A) which are stacked at the projecting portion 26 conductive. To be more specific, as also shown in FIG. 2 to FIG. 4 and FIG. 12 to FIG. 14, the clip member 4 has: a pair of oppositely facing supports 41, 42 which faces each other in an opposed manner with the two-split projecting portion 260 of the projecting portion 26 (the non-coated region 23A of the stacked positive electrode 23 or the non-coated region 24A of the stacked negative electrode 24) interposed therebetween; and a connecting portion 43 which connects corresponding one end portions of the oppositely facing supports 41, 42 to each other. The clip member 4 is formed of a material having conductivity. The clip member 4 in this embodiment is formed by bending a plate-shape metal material into a U-shape in cross section. In this embodiment, two clip members 4 are disposed on the positive electrode projecting portion 261 of the electrode assembly 2, and two clip members 4 are disposed on the negative electrode projecting portion 262 of the electrode assembly 2.

One oppositely facing support 41 of the clip member 4 has second fitting portions 45 each of which is formed of a projecting portion or a recessed portion and is engaged with the first fitting portion 44 by concavoconvex fitting engagement in a state where the projecting portion 26 is clamped between the second fitting portions 45 and the first fitting portions 44 (see FIG. 4 and FIG. 14). The oppositely facing support 41 in this embodiment has second fitting portions 45 each of which is formed of a recessed portion, is engaged with the first fitting portion 44 which is formed of a projecting portion while clamping the projecting portion 26 between the first fitting portions 44 and the second fitting portions 45. That is, the oppositely facing support 41 clamps, cooperatively with the support portion 35, the projecting portion 26 at the second fitting portions 45.

The other oppositely facing support 42 of the clip member 4 has third fitting portions 46 each of which is formed of a projecting portion or a recessed portion. The oppositely facing support 42 in this embodiment has the third fitting portions 46 each of which is formed of a projecting portion projecting in the same direction as the projecting direction of the first fitting portion 44. The third fitting portions 46 are positioned such that both the third fitting portions 46 and the projecting portion 26 are disposed between the first fitting portions 44 and the second fitting portions 45 (see FIG. 14).

The first fitting portion 44 of the support portion 35, the second fitting portion 45 of the oppositely facing support 41, and the third fitting portion 46 of the oppositely facing support 42 are arranged in a row in the Y axis direction, and are engaged with each other by fitting engagement. That is, the first fitting portion 44 is engaged with the third fitting portion 46, and the first fitting portion 44 and the third fitting portion 46 are engaged with the second fitting portion 45 by fitting engagement. Since the first fitting portion 44 and the third fitting portion 46 are engaged with the second fitting portion 45 by fitting engagement, the projecting portion 26 is held in a clamped state between the second fitting portion 45 and the third fitting portion 46. In this manner, in the energy storage device 1, three members constituted of the projecting portion 26 of the electrode assembly 2, the support portion 35 of the current collector 3, and the oppositely facing supports 41, 42 of the clip member 4 are engaged with each other by fitting engagement and hence, the electrode assembly 2 and the current collector 3 can be joined to each other. In the energy storage device 1 of this embodiment, the projecting portion 26 of the electrode assembly 2, the support portions 35 of the current collector 3, and the opposedly facing supports 41, 42 of the clip member 4 are joined to each other by clinch joining. The second fitting portions 45 and the third fitting portions 46 are formed at the time of joining the support portions 35 and the projecting portion 26 to each other. Accordingly, the second fitting portions 45 and the third fitting portions 46 are not formed on the clip member 4 (opposedly facing supports 41, 42) before joining of the support portions 35 and the projecting portion 26 to each other shown in FIG. 3, FIG. 12, and FIG. 13.

The clip members 4 for the positive electrode 23 and the clip members 4 for the negative electrode 24 are made of different materials. To be more specific, the clip members 4 for the positive electrode 23 are made of aluminum or an aluminum alloy, for example, and the clip members 4 for the negative electrode 24 are made of copper or a copper alloy, for example. That is, the opposedly facing supports 41, 42 for the positive electrode 23 are also made of aluminum or an aluminum alloy, and the opposedly facing supports 41, 42 for the negative electrode 24 are also made of copper or a copper alloy.

In the positive electrode 23, the conductive layer 232 (first conductive layer 232A) is disposed at a position corresponding to at least the first fitting portions 44 and the second fitting portions 45, that is, a position (region) which overlaps with at least the first fitting portions 44 and the second fitting portions 45 in the Y axis direction. As described above, the conductive layer 232 in this embodiment is disposed on the whole area (the whole) of one surface of the metal foil 231 which forms the positive electrode 23. Further, one surface of the non-coated region 23A covered by the conductive layer 232 (to be more specific, the first conductive layer 232A) is minimally exposed to air and hence, the oxidation of the surface minimally occurs.

In the same manner, in the negative electrode 24, the conductive layer 242 (first conductive layer 242A) is disposed at a position corresponding to at least the first fitting portions 44 and the second fitting portions 45, that is, a position (region) which overlaps with at least the first fitting portions 44 and the second fitting portions 45 in the Y axis direction. As described above, the conductive layer 242 in this embodiment is disposed on the whole area (the whole) of one surface of the metal foil 241 which forms the negative electrode 24. Further, one surface of the non-coated region 24A covered by the conductive layer 242 (to be more specific, the first conductive layer 242A) is minimally exposed to air and hence, the oxidation of the surface minimally occurs.

The external terminal 7 is a portion electrically connected to an external terminal of another energy storage device, external equipment or the like. The external terminal 7 is made of a material having conductivity. For example, the external terminal 7 is made of a metal material having high weldability such as an aluminum-based metal material such as aluminum or an aluminum alloy, or a copper-based metal material such as copper or a copper alloy. The external terminal 7 has a surface 71 to which a bus bar or the like can be welded.

The energy storage device 1 includes an insulating member 9 which insulates the electrode assembly 2 and the case 6 from each other. The insulating member 9 in this embodiment is an insulating cover, for example. As shown in FIG. 2 and FIG. 3, the insulating cover 9 is disposed between the case 6 (to be more specific, the case body 61) and the electrode assembly 2. The insulating cover 9 is made of a material having insulating property. The insulating cover 9 in this embodiment is made of a resin such as polypropylene or polyphenylenesulfide, for example. In the energy storage device 1 of this embodiment, the electrode assembly 2 (to be more specific, the electrode assembly 2 and the current collectors 3) in a state of being stored in a bag-shaped insulating cover 9 is housed in the inside of the case 6.

Figure 15:
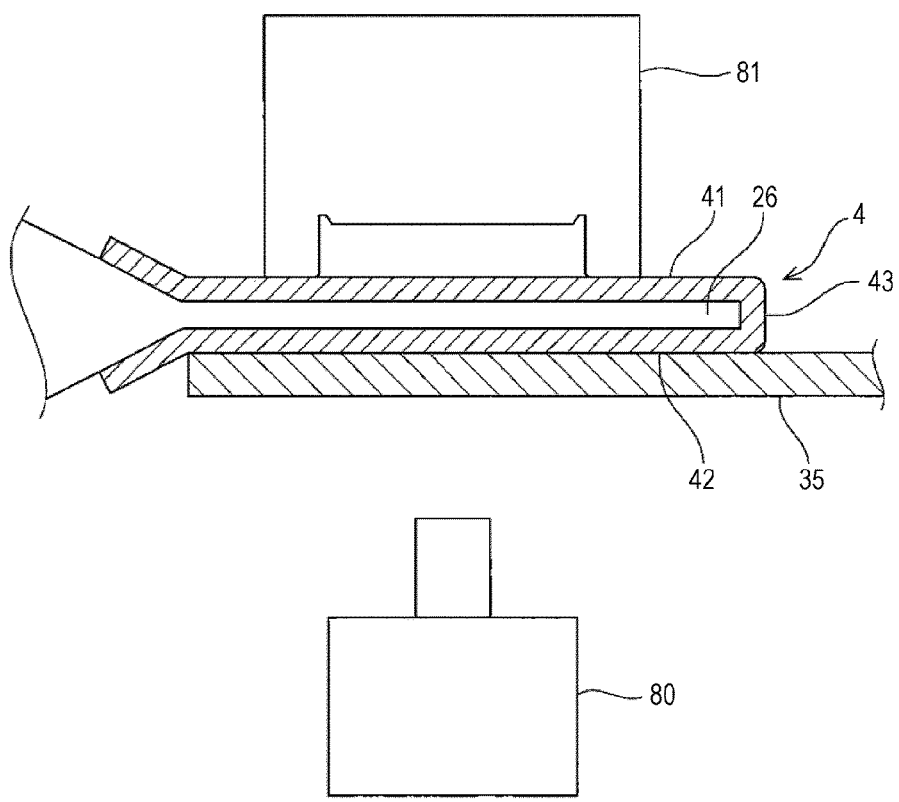
FIG. 15 is a view describing a method of joining the electrode assembly and the current collector of the energy storage device, and is a view showing a state where a support portion, a projecting portion, and an opposedly facing support are arranged.
Figure 16:
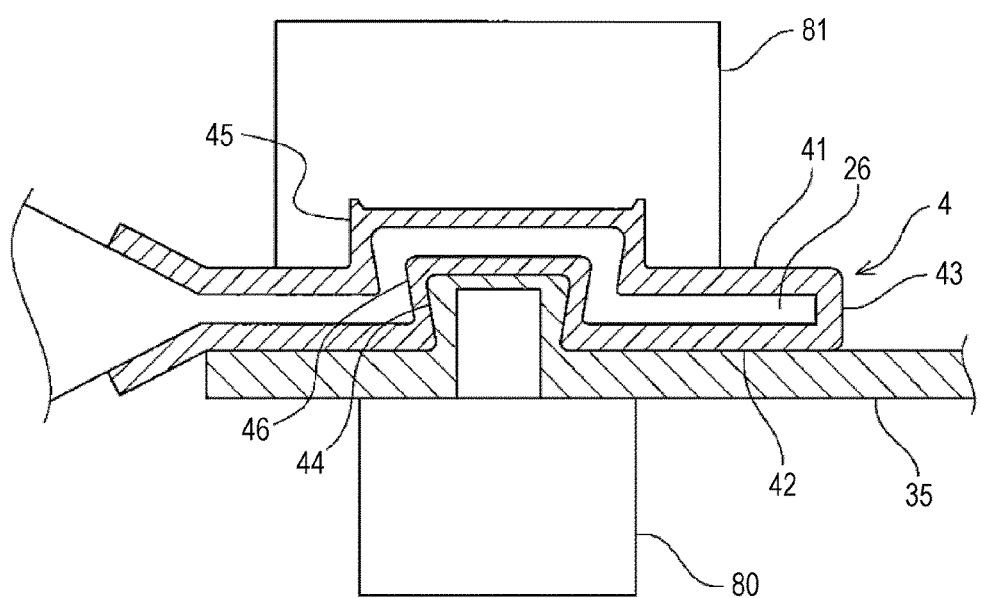
FIG. 16 is a view describing a method of joining the electrode assembly and the current collector of the energy storage device, and is a view showing a state where first to third fitting portions are formed.

The configuration of the energy storage device 1 of this embodiment has described heretofore. Next, a method of joining (by clinch joining) the support portion 35 and the opposedly facing support 41 to the projecting portion 26 (the positive electrode projecting portion 261 and the negative electrode projecting portion 262) is described with reference to FIG. 14 to FIG. 16. FIG. 14 to FIG. 16 are schematic views describing the joining method. In an actual energy storage device, a large number of stacked non-coated regions 23A, 24A (the first metal foils 231A, 241A, the first conductive layers 232A, 242A and the like) are disposed in the inside of the projecting portion 26.

Firstly, one of two split projecting portions 260 is clamped between the pair of opposedly facing supports 41, 42 of the clip member 4 and, thereafter, the support portion 35 of the current collector 3 is made to overlap with the opposedly facing support 42. Next, as shown in FIG. 15, the support portion 35 which is in an overlapped state with the clip member 4 and the clip member 4 which is in a state where the clip member 4 sandwiches one of the two-split projecting portions 260 are placed between a male mold (punch) 80 and a female mold (die) 81. At this stage of the operation, the support portion 35 and the clip member 4 which are in an overlapped state are placed between the male mold 80 and the female mold 81 such that the member having larger thickness size is positioned on a male mold 80 side. In the energy storage device 1 of this embodiment, a thickness size of the support portion 35 is set larger than respective thickness sizes of the opposedly facing supports 41, 42 and hence, the support portion 35 is disposed so as to face the male mold 80 in an opposed manner, and the clip member 4 (to be more specific, the opposedly facing support 41) is disposed so as to face the female mold 81 in an opposed manner.

Subsequently, as shown in FIG. 16, a portion of the support portion 35, a portion of the opposedly facing support 42, a portion of the projecting portion 26, and a portion of the opposedly facing support 41 which are made to overlap with each other are pressed into the inside of the female mold 81 by the male mold (punch) 80. Due to such an operation, the respective members 35, 42, 26, and 41 are partially bent so that these members 35, 42, 26, and 41 are joined to each other (engaged with each other by concavo-convex fitting engagement) by forming an interlocking portion (a diameter-enlarged portion) on the pushed-side members 35, 42, and 26 respectively. In this embodiment, these members are joined to each other by TOX (registered trademark) which is a kind of clinch joining.

At this stage of the operation, the first fitting portion 44 (a projecting portion with a diameter gradually increased toward a distal end thereof) formed on the support portion 35 and the third fitting portion 46 (a projecting portion with a diameter gradually increased toward a distal end thereof) formed on the opposedly facing support 42 are fitted in the second fitting portion 45 (a recessed portion with a diameter gradually increased toward a bottom portion thereof) formed on the opposedly facing support 41 in a state where the projecting portion 26 is clamped between the first fitting portion 44 and the third fitting portion 46 and the second fitting portion 45. In this embodiment, the first to third fitting portions 44, 45, 46 and the like are formed at two portions of one support portion 35 and at two portions of each oppositely facing support 41, 42 respectively (see FIG. 4). However, provided that the electrode assembly 2 (projecting portion 26) can be surely joined to the current collector 3 (support portion 35), the respective numbers of first fitting portions 44 and the like formed on one support portion 35 and the respective oppositely facing supports 41, 42 are not limited.

According to the energy storage device 1 described above, the non-coated region 23A, 24A is clamped by the support portion 35 and the oppositely facing support 41. Accordingly, in the positive electrode 23 or the negative electrode 24 and the current collector 3 which are brought into contact joining, the first conductive layer 232A, 242A covers at least one surface out of the surface of the non-coated region 23A, 24A facing the support portion 35 and the surface of the non-coated region 23A, 24A facing the oppositely facing support 41 and hence, the oxidation of a portion where the first conductive layer 232A, 242A is formed can be suppressed. Accordingly, the increase in resistance between members caused by the oxidation of the portion can be suppressed. As a result, an electrical connection in the joined portion between the electrode assembly 2 and the current collector 3 can be maintained in a favorable state.

In the energy storage device 1 of this embodiment, the first conductive layer 232A, 242A is disposed at a position corresponding to at least the first fitting portions 44 and the second fitting portions 45 (in an example of this embodiment, the position which overlaps with the first fitting portions 44 and the second fitting portions 45 in the Y axis direction). With such a configuration, the first conductive layer 232A, 242A is formed at the portion where the first fitting portions 44 and the second fitting portions 45 are engaged with each other by concavoconvex fitting engagement (that is, the portion where the overlapping members are brought into close contact with each other by concavoconvex fitting engagement) and hence, the oxidation of the surface covered by (brought into contact with) the first conductive layer 232A, 242A is prevented. As a result, an electrical connection is maintained in a favorable state at the portion (the portion where the concavoconvex fitting engagement is made).

In the energy storage device 1 of this embodiment, the first fitting portion (projecting portion) 44 is formed on the support portion 35 having a larger thickness size than the oppositely facing support 41, and the second fitting portion (recessed portion) 45 is formed on the oppositely facing support 41 having a smaller thickness size than the support portion 35. Accordingly, even when the thickness of the first fitting portion (projecting portion) 44 is decreased at the time of performing clinch joining (at the time of performing molding using a die) so that a strength of the first fitting portion 44 is lowered, the first fitting portion (projecting portion) 44 can ensure a predetermined strength.

In the electrode assembly 2 in this embodiment, the first conductive layer 232A, 242A contains a carbonaceous material (carbon black in an example of this embodiment). Accordingly, favorable conductivity can be ensured between the electrode assembly 2 and the current collector 3. Further, by adopting the first conductive layer 232A, 242A containing a carbonaceous material in the electrode assembly 2, a friction of the first metal foil 231A, 241A is decreased. Accordingly, even when the first metal foils 231A, 241A rub each other due to vibrations of the energy storage device 1 or the like, it is possible to suppress the generation of metal powder. Further, a friction of the first metal foil 231A, 241A is decreased at the time of joining the support portion 35 and the oppositely facing support 41 to each other by clinch joining and hence, slippage of the first metal foil 231A, 241A can be improved thus suppressing the generation of metal powder.

In the energy storage device 1 of this embodiment, the first metal foil 231A, 241A of the non-coated region 23A, 24A and the second metal foil 231B, 241B of the coated region 23B, 24B are continuously (integrally) formed with each other, and the first conductive layer 232A, 242A formed on the first metal foil 231A, 241A and the second conductive layer 232B, 242B formed on the second metal foil 231B, 241B are continuously (integrally) formed with each other. In this manner, the conductive layer 232, 242 (the first conductive layer 232A, 242A and the second conductive layer 232B, 242B) in the coated region 23B, 24B (to be more specific, the coated region between the second metal foil 231B, 241B and the active material layer 233, 243) are continuously (integrally) formed such that the conductive layer 232, 242 extends over the non-coated region 23A, 24A. Accordingly, in addition to the flow of electrons toward the current collector 3 from the active material layer 233, 234 through the metal foil 231, 232, it is also possible to generate the flow of electrons directly toward the current collector 3 from the active material layer 233, 243 through the conductive layer 232, 242. As a result, conductivity between the electrode assembly 2 and the current collector 3 can be further enhanced.

In the energy storage device 1 of this embodiment, the conductive layer 232, 242 covers the whole area of at least one surface out of the surface of the non-coated region 23A, 24A facing the support portion 35, and the surface of the non-coated region 23A, 24A facing the oppositely facing support 41, 42. In this manner, the whole area of at least one surface of the non-coated region 23A, 24A (the first metal foil 231A, 241A) is covered by the first conductive layer 232A, 242A and hence, oxidation is prevented over the whole surface. That is, in the non-coated region 23A, 24A, an area where oxidation minimally occurs is increased compared to a case where the first conductive layer 232A, 242A is formed only at positions corresponding to the first fitting portions 44 and the second fitting portions 45. Accordingly, conductivity between the electrode assembly 2 and the current collector 3 can be further enhanced.

In this embodiment, with respect to the surface of the non-coated region 23A, 24A facing the support portion 35, the surface of the non-coated region 23A, 24A facing the oppositely facing support 41, 42 and the surface of the metal foil 231, 241, the configuration "the conductive layer covers the whole surface" also includes the configuration where, in a step of forming the conductive layer 232, 242 on a surface of a predetermined member (for example, in a step of forming the conductive layer 232, 242 on the metal foil 231, 241 by coating), the conductive layer 232, 242 is applied to (formed on) the surface while leaving a slight portion where the conductive layer 232, 242 is not applied on the edge of the surface (for example, an area within a range of approximately 1 to 2 mm from the edge). Further, the configuration "the conductive layer covers the whole surface" also includes the configuration where a non-coated region (a portion where the conductive layer 232, 242 is not formed) is formed on a slight portion on the edge of the surface due to sagging or the like of the conductive layer 232, 242 before the conductive layer 232, 242 is solidified in the coating step. Further, the configuration "the conductive layer covers the whole surface" also includes the configuration where the conductive layer 232, 242 is chipped or peeled off at a slight portion on the edge of the surface when the metal foil 231, 241 on which the conductive layer 232, 242 is formed is cut (slit) into a predetermined shape (for example, a strip shape).

In the energy storage device 1 of this embodiment, the conductive layer 232, 242 covers the whole surface of the metal foil 231, 241 facing the active material layer 233, 243 between the metal foil 231, 241 and the active material layer 233, 243. With such a configuration, the oxidation of the whole surface of the metal foil 231, 241 facing the active material layer 233, 243 can be prevented. Further, in addition to the flow of electrons toward the current collector 3 from the active material layer 233, 243 through the metal foil 231, 241, it is possible to generate the larger flow of electrons directly toward the current collector 3 from the active material layer 233, 243 through the conductive layer 232, 242. Accordingly, conductivity between the electrode assembly 2 and the current collector 3 can be further enhanced.

In the electrode assembly 2 in this embodiment, the non-coated region 23A, 24A is disposed at an end portion of the electrode assembly 2 in a winding center axis direction (X axis direction). Even in a so-called winding-type electrode assembly 2 where the positive electrode 23 and the negative electrode 24 are wound in a stacked state, by forming the first conductive layer 232A, 242A, the increase in resistance between the members caused by oxidation at the end portion in the winding center axis direction can be suppressed. Accordingly, an electrical connection at the joined portion between the electrode assembly 2 and the current collector 3 can be maintained in a favorable state.

It is needless to say that the energy storage device of the present invention is not limited to the above-mentioned embodiment, and various modifications are conceivable without departing from the gist of the present invention. For example, to a configuration of one embodiment, a configuration of another embodiment may be added. Further, a part of a configuration of one embodiment may be replaced with a configuration of another embodiment. Still further, a part of a configuration of one embodiment may be eliminated.

In the energy storage device 1 of the above-mentioned embodiment, a so-called winding-type electrode assembly 2 where the strip-shaped positive electrode 23 and the strip-shaped negative electrode 24 are wound is used. However, the present invention is not limited to such a configuration. As the electrode assembly 2, a so-called stacked-type electrode assembly where sheet-shaped positive electrodes 23, sheet-shaped negative electrodes 24, and sheet-shaped separators 25 are stacked onto each other in the Y axis direction may also be adopted.

In the energy storage device 1 of the above-mentioned embodiment, the conductive layer (the first conductive layer 232A, 242A) having non-oxidizing property or hardly-oxidizable property is formed on one surface of the first metal foil 231A, 241A in the non-coated region 23A, 24A of the positive electrode 23 and the negative electrode 24. However, the present invention is not limited to such a configuration. For example, it is sufficient that the conductive layer having non-oxidizing property or hardly-oxidizable property is formed on at least one surface out of a surface of the oppositely facing support 41, 42 facing the non-coated region 23A, 24A, a surface of the oppositely facing support 42 facing the support portion 35, a surface of the support portion 35 facing the non-coated region 23A, 24A (oppositely facing support 42), and one surface or both surfaces of the first metal foil 231A, 241A in the non-coated region 23A, 24A.

Figure 17:
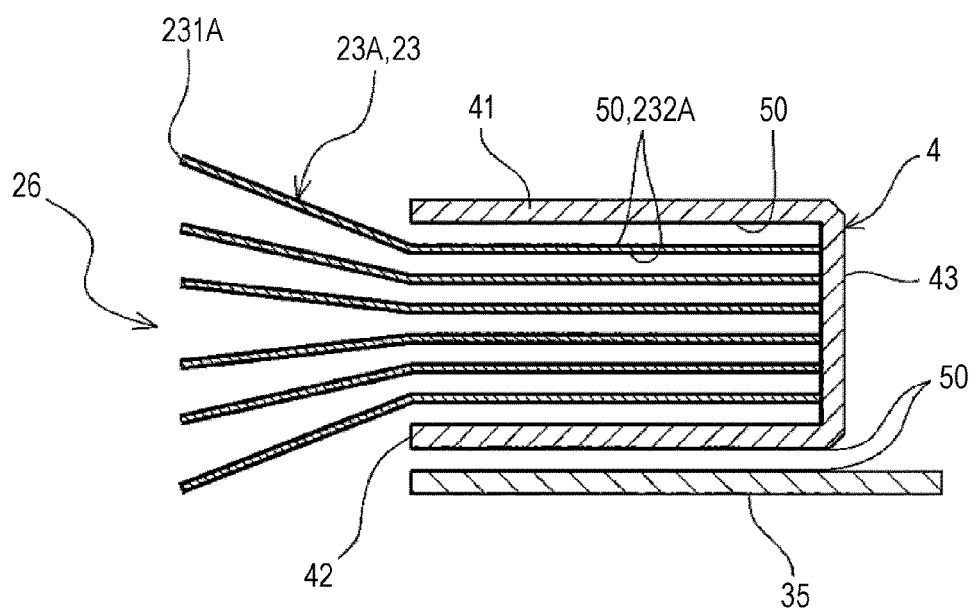
FIG. 17 is an enlarged cross-sectional view schematically showing a joint portion between an electrode assembly and a current collector of an energy storage device according to another embodiment.

For example, as shown in FIG. 17, a conductive layer 50 having non-oxidizing property or hardly-oxidizable property may be formed on all surfaces of the plurality of non-coated regions 23A, 24A stacked onto each other at the projecting portion 26 (preferably, in a close contact manner). With such a configuration, deviation minimally occurs in an electric current generated in each electrode (the positive electrode 23 or the negative electrode 24). To be more specific, deviation in an electric current caused by oxidation of the surface of the first metal foil 231A, 241A (formation of an oxide film) minimally occurs. Accordingly, lowering of an output of the energy storage device 1 can be suppressed. Although FIG. 17 shows the configuration where the positive electrode 23 is stacked in six layers at the projecting portion 26 for the sake of convenience of explanation, in an actual energy storage device, the positive electrode 23 is stacked in large number of layers.

Further, the conductive layer 50 may be formed (preferably in a close contact manner) on the surface of the oppositely facing support 41, 42 facing the non-coated region 23A, 24A and the surface of the non-coated region 23A, 24A arranged adjacently to the oppositely facing support 41, 42 facing the oppositely facing support 41, 42 respectively. With such a configuration, the increase in resistance between the non-coated region 23A, 24A and the oppositely facing support 41, 42 caused by oxidation (formation of an oxide film) can be suppressed and hence, it is possible to maintain a favorable electrical connection between the electrode assembly 2 and the clip member 4 (oppositely facing support 41, 42).

Further, the conductive layer 50 may be formed (preferably, in a close contact manner) on the surface of the support portion 35 and the surface of the oppositely facing support 42 which face each other in an opposed manner. With such a configuration, the increase in resistance between the support portion 35 and the oppositely facing support 42 caused by oxidation (formation of an oxide film) can be suppressed and hence, it is possible to maintain a favorable electrical connection between the current collector 3 and the clip member 4.

In the energy storage device 1, it is sufficient that the conductive layer 50 having non-oxidizing property or hardly-oxidizable property is formed at the positions which correspond to at least the first fitting portions 44 and the second fitting portions 45 as described above (in an example of the above-mentioned embodiment, regions overlapping with each other in the Y axis direction). However, from a viewpoint of suppressing the increase in resistance (the increase in resistance caused by oxidation) between members through a metal surface by preventing oxidation of the metal surface (formation of an oxide film), with respect to a metal surface of the positive electrode 23, a metal surface of the negative electrode 24, a metal surface of the support portion 35 facing the non-coated region 23A, 24A or the oppositely facing support 42, and a metal surface of the oppositely facing support 41, 42 facing the non-coated region 23A, 24A, it is preferable to form the conductive layer 50 on the whole area of each surface which is exposed to air unless the conductive layer 50 is formed thereon.

The conductive layer 232, 242 may be formed on only one surface or on both surfaces of the metal foil 231, 241. It is preferable to form the conductive layer 232, 242 on both surfaces of the metal foil 231, 241. With such a configuration, oxidation can be prevented on both surfaces of the metal foil 231, 241 and hence, in the projecting portion 26, a favorable conductive state between the non-coated regions 23A which are stacked adjacently to each other in the Y axis direction and a favorable conductive state between the non-coated regions 24A which are stacked adjacently to each other in the Y axis direction can be surely maintained.

In the energy storage device 1 of the above-mentioned embodiment, the conductive layer 232, 242 interposed between the metal foil 231, 241 and the active material layer 233, 243 is continuously formed over the projecting portion 26. That is, the first conductive layer 232A, 242A and the second conductive layer 232B, 242B are continuously (integrally) formed with each other. However, the present invention is not limited to such a configuration. The first conductive layer 232A, 242A and the second conductive layer 232B, 242B may be formed as separated parts, that is, a gap may be formed between the first conductive layer 232A, 242A and the second conductive layer 232B, 242B or another member may be arranged between the first conductive layer 232A, 242A and the second conductive layer 232B, 242B.

Figure 18:
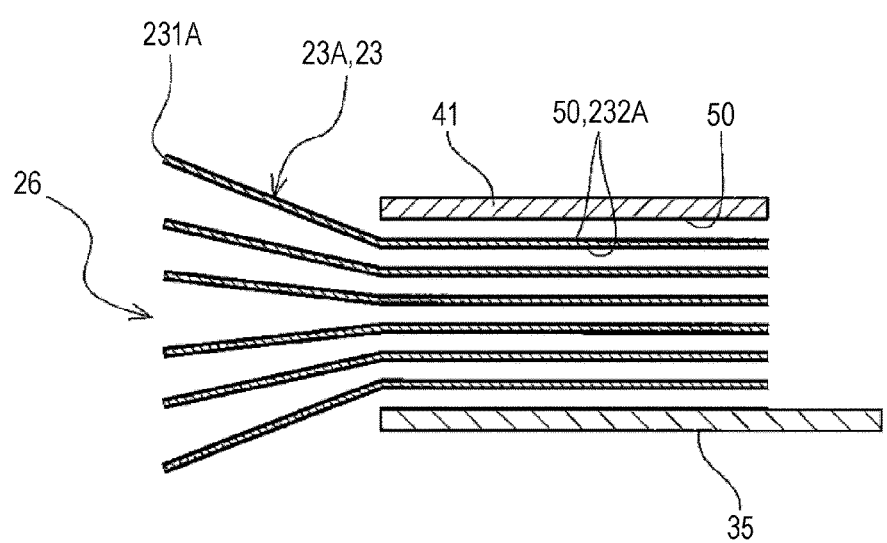
FIG. 18 is an enlarged cross-sectional view schematically showing a joint portion between an electrode assembly and a current collector of an energy storage device according to still another embodiment.

In the energy storage device 1 of the above-mentioned embodiment, the oppositely facing support 41 is constituted as a part of the clip member 4 (the oppositely facing support 41 is connected to the oppositely facing support 42 by way of the connecting portion 43). However, the present invention is not limited to such a configuration. For example, as shown in FIG. 18, the oppositely facing support 41 may be formed of a single member. In this case, the oppositely facing support 41 and the support portion 35 of the current collector 3 directly clamp the projecting portion 26 without interposing a support corresponding to the oppositely facing support 42 in this embodiment therebetween. Further, the oppositely facing support 41 may not be formed as a part of the clip member 4 or a single oppositely facing support but may be formed integrally with the current collector 3 (support portion 35). For the sake of convenience of explanation, FIG. 18 shows a configuration where the positive electrode 23 is stacked in six layers. However, in an actual energy storage device, the positive electrode 23 is stacked in a large number of layers.

In the energy storage device 1 of the above-mentioned embodiment, the first conductive layer 232A, 242A is formed on the metal foil 231, 241 in both the positive electrode 23 and the negative electrode 24. However, the present invention is not limited to such a configuration. The configuration may be adopted where the first conductive layer 232A, 242A is formed on the metal foil 231, 241 in either one of the positive electrode 23 and the negative electrode 24. In this case, since aluminum is easily oxidized, it is preferable that the first conductive layer 232A be formed on the metal foil (aluminum foil) 231 at least in the positive electrode 23 out of the positive electrode 23 and the negative electrode 24.

In the energy storage device 1 of the above-mentioned embodiment, the conductive layer (first conductive layer 232A, 242A) having non-oxidizing property or hardly-oxidizable property is formed on the positive electrode 23 and the negative electrode 24. However, the present invention is not limited to such a configuration. For example, the conductive layer may be formed on only the support portions 35 of the current collector 3, or may be formed on only the oppositely facing supports 41 or 42 of the clip members 4. That is, it is sufficient that at least one of the non-coated region 23A, 24A, the support portions 35, and the oppositely facing supports 41 include the conductive layer which has non-oxidizing property or hardly-oxidizable property and covers at least one of the surface of the non-coated region 23A, 24A facing the support portion 35 and the surface of the non-coated region 23A, 24A facing the oppositely facing support 41, the surface of the support portion 35 facing the non-coated region 23A, 24A, or the surface of the oppositely facing support 41, 42 facing the non-coated region 23A, 24A.

In the energy storage device 1 of the above-mentioned embodiment, the conductive layer 232, 242 is formed by applying a material obtained by dispersing polyvinylidene fluoride and carbon black into a solvent to the metal foil 231, 241 by coating and, thereafter, by drying such a material. However, the present invention is not limited to such a configuration. The conductive layer 232, 242 may be formed by adhering a sheet-shaped conductive material where an adhesive layer is formed on a portion of one surface thereof to the metal foil 231, 241. Further, the conductive layer 232, 242 may be formed by sandwiching a conductive material between the oppositely facing metal foils 231, 241. Further, it is preferable that a conductive material contained in the conductive layer 232, 242 be provided in the form of particles. In the case where the conductive material is provided in the form of particles, by interposing the conductive material between the metal foils 231, 241, the conductive material is moved thus filling a gap formed between the metal foils 231, 241 and hence, it is possible to suppress the oxidation of a portion where the conductive layer is formed.

In the energy storage device 1 of the above-mentioned embodiment, the first fitting portion 44 formed on the support portion 35 is formed of a projecting portion, and the second fitting portion 45 formed on the oppositely facing support 41 is formed of a recessed portion into which the first fitting portion 44 is fitted. However, the present invention is not limited to such a configuration. The second fitting portion 45 may be formed of a projecting portion, and the first fitting portion 44 may be formed of a recessed portion into which the second fitting portion 45 is fitted.

The first fitting portions 44 and the second fitting portions 45 of the above-mentioned embodiment are formed simultaneously by clinch joining (by clamping the first fitting portions 44 and the second fitting portions 45 between the male mold 80 and the female mold 81). However, the present invention is not limited to such a configuration. The first fitting portions 44 and the second fitting portions 45 may be fitted to each other after the first fitting portions 44 and the second fitting portions 45 are formed separately.

In the energy storage device 1 of the above-mentioned embodiment, the first fitting portions 44 and the second fitting portions 45 are formed. However, the present invention is not limited to such a configuration. The support portion 35 or the oppositely facing support 41 and the metal foil 231, 241 may be electrically connected to each other by mechanically bringing these members into pressure contact with each other in a state where the support portion 35 and the oppositely facing support 41 sandwich the metal foil 231, 241 therebetween. Also in this case, it is possible to suppress the oxidation of a portion where the conductive layer is formed. As a method of mechanically bringing these members into pressure contact with each other, for example, a method is considered where the metal foil 231, 241 is clamped by the clip member having elasticity. Also a method is considered where the case 6 is indirectly brought into pressure contact with the metal foil 231, 241 by way of a spacer which fills a gap formed between the case 6 and the electrode assembly 2.

In the above-mentioned embodiment, the description has been made with respect to the case where the energy storage device is used as a chargeable and dischargeable nonaqueous electrolyte secondary battery (for example, a lithium ion secondary battery). However, a kind and a size (a capacity) of the energy storage device may be arbitrarily set. Further, in the above-mentioned embodiment, as one example of the energy storage device, the description has been made with respect to the lithium ion secondary battery. However, the energy storage device is not limited to the lithium ion secondary battery. For example, the present invention is also applicable to various secondary batteries, primary batteries, and other energy storage devices for capacitors such as electric double-layered capacitors.

Figure 19:
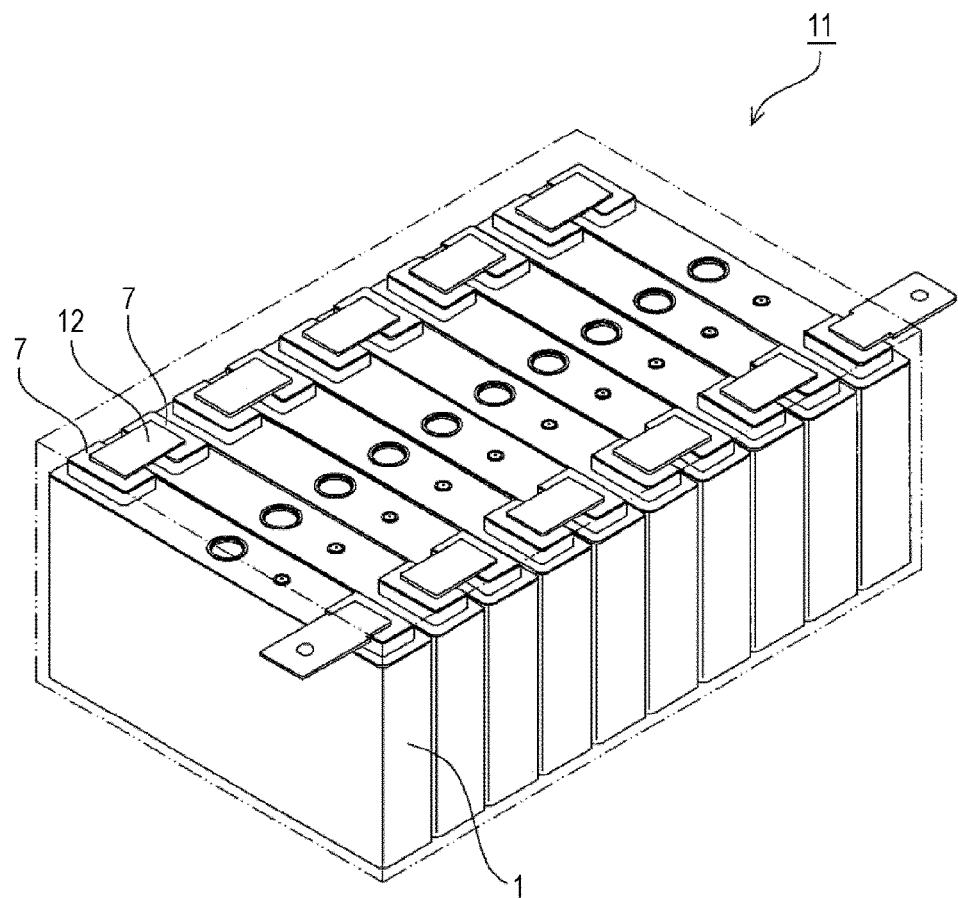
FIG. 19 is a perspective view of an energy storage apparatus including the energy storage devices according to one embodiment.
Figure 20:
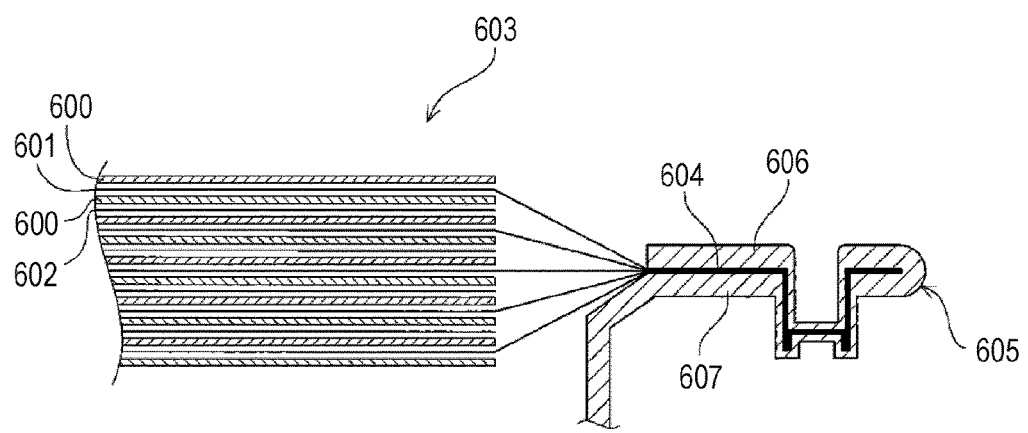
FIG. 20 is a cross-sectional view of a joint portion between an electrode assembly and a current collector of a conventional energy storage device.

The energy storage device (for example, a battery) may be used for the energy storage apparatus (when an energy storage device is a battery, a battery module) 11 shown in FIG. 19. The energy storage apparatus 11 includes at least two energy storage devices 1, and bus bar members 12 which electrically connect two (different) energy storage devices 1 to each other. In this case, it is sufficient that a technique of the present invention is applied to at least one energy storage device 1.

Example 1

To confirm the advantageous effects acquired by the energy storage device according to the present invention, a change in direct current resistance was checked using a first energy storage device which includes a conductive layer, and a second energy storage device which does not include a conductive layer.

In the first energy storage device (to be more specific, a lithium ion secondary battery), a conductive layer 50 was formed on all surfaces of a plurality of non-coated regions 23A stacked onto each other at a positive electrode projecting portion 261, and a conductive layer 50 was formed on all surfaces of a plurality of non-coated regions 24A stacked onto each other at a negative electrode projecting portion 262. The conductive layer 50 was formed by applying a material obtained by dispersing polyvinylidene fluoride and carbon black as a binding agent into a solvent to the metal foil 231, 241 by coating and, thereafter, by drying such a material. The positive electrode projecting portion 261 and a current collector 3, and the negative electrode projecting portion 262 and the current collector 3 were respectively joined to each other by TOX (registered trademark) which is a kind of clinch joining.

With respect to the first energy storage device, a direct current resistance Rp between an external terminal 7 on a positive electrode and the non-coated region 23A positioned at the outermost periphery on the positive electrode, and a direct current resistance Rn between an external terminal 7 on a negative electrode and the non-coated region 24A positioned at the outermost periphery on the negative electrode were measured. Further, an initial direct current resistance A of the first battery was calculated based on the sum of the measured values Rp and Rn.

Next, the direct current resistance Rp and the direct current resistance Rn of the first energy storage device were measured after storing the first energy storage device for a month at a temperature of 45° C., and a direct current resistance A of the first energy storage device was calculated after storing the first energy storage device for a month based on a sum of Rp and Rn.

The second energy storage device is substantially equal to the first energy storage device except for the configuration that the second energy storage device does not include the conductive layer 50. Direct current resistances Rp, Rn were measured also with respect to the second energy storage device in the substantially same manner as the first energy storage device, and an initial direct current resistance B and a direct current resistance B' after storing the second energy storage device were respectively calculated based on the sum of the direct current resistances Rp, Rn.

Results of direct current resistances calculated as described above are shown in Table 1. In Table 1, values of the respective direct current resistances are relative values assuming an initial direct current resistance A of the first battery as 100.

TABLE 1

|  | initial direct current resistance | direct current resistance after storing energy storage device |
| --- | --- | --- |
| first energy storage device | A = 100 | A' = 100 |
| second energy storage device | B = 105 | B' = 130 |

From the results shown in Table 1, it is understood that the increase in a direct current resistance after storing an energy storage device is suppressed in the first energy storage device including a conductive layer compared to the second energy storage device which includes no conductive layer. It is estimated that the first energy storage device includes the conductive layer and hence, an electrical connection in a joined portion between the electrode assembly and the current collector is brought into a favorable state.

What is claimed is:

1. An energy storage device, comprising:
   an electrode assembly including a positive electrode and a negative electrode that are stacked, the positive electrode and the negative electrode respectively including a non-coated region including a metal foil;
   current collectors each including a support portion which is configured to overlap with the non-coated region; and
   opposedly facing supports each configured to clamp the non-coated region cooperatively with the support portion,
   wherein at least one of the non-coated region, the support portion, and an opposedly facing support of the opposedly facing supports includes a conductive layer covering at least one surface out of a surface of the non-coated region facing the support portion, a surface of the non-coated region facing the opposedly facing support, a surface of the support portion facing the non-coated region, and a surface of the opposedly facing support facing the non-coated region,
   wherein at least one of the positive electrode and the negative electrode includes the non-coated region and a coated region formed adjacently to the non-coated region,
   wherein the non-coated region includes a first conductive layer which forms the conductive layer,
   wherein the coated-region includes:
      a second metal foil continuously formed with a first metal foil which includes a metal foil of the non-coated region;
      a second conductive layer being stacked on the second metal foil in a close contact state; and
      an active material layer stacked on the second conductive layer such that the second conductive layer is sandwiched between the active material layer and the second metal foil,
   wherein the first conductive layer and the second conductive layer are continuously formed with each other, and wherein the first conductive layer and the second conductive layer include a carbonaceous material, a conductive resin, or a noble metal, respectively.

2. The energy storage device according to claim 1, wherein the support portions include a first fitting portion including one of a projecting portion and a recessed portion,
   wherein the opposedly facing support includes a second fitting portion including an other of the projecting portion and the recessed portion, the second fitting portion being engaged with the first fitting portion by concavoconvex fitting engagement in a state where the non-coated region is clamped between the first fitting portion and the second fitting portion, and
   wherein the conductive layer is disposed at a position corresponding to at least the first fitting portion and the second fitting portion.

3. The energy storage device according to claim 2, wherein the projecting portion and the recessed portion which form the first fitting portion and the second fitting portion comprise portions formed by molding using a male mold and a female mold,
   wherein the projecting portion is formed on one of the support portion and the opposedly facing support, whichever has a larger thickness size, and
   wherein the recessed portion is formed on one of the support portion and the opposedly facing support, whichever has a smaller thickness size.

4. The energy storage device according to claim 1, wherein the non-coated region of one of the positive electrode and the negative electrode is stacked, and
   wherein the conductive layer is formed on respective surfaces of the non-coated regions which face each other in an opposed manner in the stacked state.

5. The energy storage device according to claim 1, wherein the conductive layer contains the carbonaceous material.

6. The energy storage device according to claim 1, wherein the conductive layer covers an entirety of at least one surface out of the surface of the non-coated region facing the support portion, and the surface of the non-coated region facing the opposedly facing support.

7. The energy storage device according to claim 1, wherein the positive electrode and the negative electrode respectively include:
   the metal foil; and
   an active material layer stacked on the metal foil in regions of the metal foil except for the non-coated region, and
   wherein the conductive layer covers an entirety of a surface of the metal foil facing the active material layer between the metal foil and the active material layer.

8. The energy storage device according to claim 1, wherein the positive electrode and the negative electrode are wound in a stacked state in the electrode assembly, and
   wherein the non-coated region is disposed at an end portion of the electrode assembly in a winding center axis direction.

9. The energy storage device according to claim 1, wherein the first conductive layer and the second conductive layer include the carbonaceous material.

10. The energy storage device according to claim 1, wherein the first conductive layer and the second conductive layer include the conductive resin.

11. The energy storage device according to claim 1, wherein the first conductive layer and the second conductive layer include the noble metal.

* * * * *